(12) United States Patent
Kumar et al.

(10) Patent No.: US 8,145,554 B2
(45) Date of Patent: Mar. 27, 2012

(54) PORTFOLIO SYNCHRONIZING BETWEEN DIFFERENT INTERFACES

(75) Inventors: Srihari Kumar, Santa Clara, CA (US); Satyen Desai, San Bruno, CA (US); John Kelley, Palo Alto, CA (US); Blake Earl Hayward, Redwood Shores, CA (US); Jennifer Green Scott, San Francisco, CA (US); Senthil Kumar Pandurangan, San Jose, CA (US)

(73) Assignee: Yodlee.com, Inc, Redwood City, CA (US)

( * ) Notice: Subject to any disclaimer, the term of this patent is extended or adjusted under 35 U.S.C. 154(b) by 0 days.

(21) Appl. No.: 13/188,796

(22) Filed: Jul. 22, 2011

(65) Prior Publication Data

US 2011/0282782 A1    Nov. 17, 2011

Related U.S. Application Data

(63) Continuation of application No. 12/621,225, filed on Nov. 18, 2009, now Pat. No. 7,991,673, which is a continuation of application No. 09/854,233, filed on May 10, 2001, now Pat. No. 7,644,023, which is a continuation-in-part of application No. 09/826,613, filed on Apr. 4, 2001, now abandoned, which is a continuation-in-part of application No. 09/698,708, filed on Oct. 27, 2000, now Pat. No. 7,672,879, which is a continuation-in-part of application No. 09/425,626, filed on Oct. 22, 1999, now Pat. No. 6,802,042, which is a continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073.

(51) Int. Cl.
*G06Q 40/00* (2006.01)
(52) U.S. Cl. ....................................... 705/36 R; 705/37
(58) Field of Classification Search ........... 705/36 R–38
See application file for complete search history.

(56) References Cited

U.S. PATENT DOCUMENTS 6,606,606 B2 *   8/2003   Starr .......................... 705/36 R

* cited by examiner

*Primary Examiner* — Thu Thao Havan
(74) *Attorney, Agent, or Firm* — Donald R. Boys; Central Coast Patent Agency, Inc.

(57) ABSTRACT

An account coordination system includes an Internet-connected server executing software from a non-transitory, machine-readable medium. The software provides direct linking between the server and two or more financial enterprises hosting each at least one financial account for a specific user and having an interactive interface through which the user may interact with his/her account, direct linking between the server and one or more third-party enterprises providing interactive interfaces through which the user may access and interact with one or more of the financial accounts at the financial enterprises, and tracking functionality whereby the server tracks activity by the user at any of the interactive interfaces through which the user may interact with one of the financial accounts. The server propagates any change made in an account by the user at any one of the interactive interfaces to the sites hosting the other interactive interfaces.

10 Claims, 24 Drawing Sheets

Portfolio Tracker

My Investments

| Symbol | Quantity | Price | as of | $ Change | Calculated Value |
|---|---|---|---|---|---|
| AOL | 100 | 53.000 | 12:34 | +1.50 | 5,300.00 |
| EMC | — | 92.125 | 10/09 | -1.75 | — |
| FMAGX | 50 | 138.660 | | +.25 | 6,933.00 |
| MSFT | 50 | 72.190 | 12:35 | +.15 | 3,609.38 |
| Cash | — | — | — | — | 2,375.12 |
| Total Value | | | | | 18,217.50 |

Price, as of and $ Change provided by S&P Comstock.

[Get Quote] — 317

Select Securities

Select Securities

Select the investment accounts you want to track in your portfolio.    Don't see your brokerage account?

- ☑ Charles Schwab
- ☑ Paine Webber
- ☑ E*Trade

[Add a New Account]

Select the indices you want to track in your portfolio.

- ☑ Dow Jones Industrial Average
- ☑ NASDAQ Composite
- ☑ S&P 500

Enter symbols for other stocks and funds you want to track, separated by commas.

EMC

[Cancel]   [Update Portfolio Now]

PORTFOLIO SYNCHRONIZING BETWEEN DIFFERENT INTERFACES

CROSS-REFERENCE TO RELATED DOCUMENTS

The present invention is a continuation of patent application Ser. No. 12/621,225, filed Nov. 18, 2009, which is a continuation to patent application Ser. No. 09/854,233, filed May 10, 2001 and issued as U.S. Pat. No. 7,644,023 on Jan. 5, 2010, which is a continuation in part (CIP) to patent application Ser. No. 09/826,613, filed Apr. 4, 2001 and now abandoned, which is a CIP to patent application Ser. No. 09/698,708, filed Oct. 27, 2000 and issued as U.S. Pat. No. 7,672,879 on Mar. 2, 2010, which is a CIP to patent application Ser. No. 09/425,626, filed Oct. 22, 1999 and issued as U.S. Pat. No. 6,802,042 on Oct. 5, 2004, which is a CIP to a patent application Ser. No. 09/323,598, filed on Jun. 1, 1999 and issued as U.S. Pat. No. 6,199,077 on Mar. 26, 2001, which is a CIP to patent application Ser. No. 09/208,740, filed on Dec. 8, 1998 and issued as U.S. Pat. No. 6,412,073 on Jun. 25, 2002, disclosures of which are incorporated herein in their entirety by inclusion and reference.

BACKGROUND OF THE INVENTION

1. Field of the Invention

The present invention is in the field of Internet navigation including various communication means and connection technologies. The present invention pertains particularly to a software capability for enabling transparent data synchronizing of personal portfolio data actions between disparate data interfaces existing on a same data-packet-network.

2. Description of the State of the Art

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in patent application Ser. No. 09/208,740 entitled "Method and Apparatus for Providing and Maintaining a User-Interactive Portal System Accessible via Internet or other Switched-Packet-Network", provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

In addition to the features described above, patent application Ser. No. 09/523,598 entitled "Method and Apparatus for Obtaining and Presenting WEB Summaries to Users" describes a software agent used in conjunction with a search function that is enabled to navigate to any URL or group of URL's, provided as input by a user or otherwise deemed appropriate by the service provider, for the purpose of providing summary information regarding updated content for each URL, which may be presented as an HTML information-page to the user.

The above described service uses known site logic for navigating to specific "chunks" of data contained in Web pages at the site. Logic scripts are prepared by knowledge workers operating on behalf of users. With such scripts, gatherer agents may navigate directly to data portions that users are interested in.

Users who subscribe to many on-line services generally do all of their banking, investing, travel arranging, shopping, and so on while on-line with the Internet. Having all of his or her services available at one portal provides a convenience to a user in not having to remember a plurality of passwords, or to be required to physically log-on to each site. Similarly, the ability to obtain summary data associated with selected sites through one interface allows a user to greatly speed any decision making process related to his or her on-line activity. However, summary information may not help a user with certain other concerns. For example, obtaining accurate financial information concerning his entire portfolio of banking and investments would require much user calculation depending on the exact nature of the result desired. Similarly compiling a trend that reflects a user's on-line activity at a plurality of shopping services may also require considerable calculation to be performed by a user. Summary data presented in the above methods is general in nature and reflects such as updates, status of orders, and the like.

An Internet-connected portal system, known to the inventor, has a data repository, a data-gathering system, a request processor, a plurality of report algorithms, and a report processor. The request processor receives a request from a user and matches the request to an individual one of the report algorithms. The data-gathering subsystem accesses plural Internet sites associated with the user and extracts raw data therefrom according to needs of the report algorithm. The report processor processes the raw data according to the report algorithm into meta-summarized information defined by the report algorithm, and the portal system transmits the meta-summarized information as a report to a destination associated with the report request. In some cases there is an aggregated-data database in the data repository storing aggregated data retrieved for specific users periodically, and the request processor checks the aggregated-data database for needed data before requiring the data-gathering system to retrieve data from the associated Internet sites. In the instance that the needed data is stored in the aggregated-data database, the report is prepared from the aggregated data. Reports may be presented in a form such as to include text and graphic formats.

In view of various functional enhancements including the ability to provide calculative and solution-oriented reporting, it has occurred to the inventor that a single interface, through which summary and detailed data may be viewed and manipulated must be provided that is user-friendly, compact and interlinked in terms of request-to-result functionality wherein access and request actions may be performed by working within any category or department of data that may be available to be viewed through the interface. Current and prior-art interactive interface software used with typical data presentation services lacks the flexibility of providing multiple points of intractability within the interface as well as enabling cross-solution implementation across multiple categories of data viewable through the interface.

The above challenges exist with prior-art services in part because they lack much of the interactive capability required in order to enable a fully functional data interface, especially one that interfaces a user with a wide range of disparate data categories.

A software suite known to the inventor for enabling viewing and manipulation of multiple categories of aggregated data compiled from a plurality of data sources and accessible through a single interface operated on a data-packet-network. Data manageable through the software suite is obtained from data sources that are available for direct network-access through multiple access points available from within the interface. The software suite comprises, a calendar module having at least one display interface for enabling viewing and manipulation of time and date-sensitive calendar data, a transaction module having at least one display interface for enabling viewing and manipulation of financially oriented account data, a portfolio-tracking module having at least one display interface for enabling viewing and manipulation of investment oriented account data, a net-worth reporting module having at least one display interface for displaying a solution-oriented net-worth report compiled from the aggregated data, a bill-payment module having at least one display interface for enabling viewing and initiation of payment action regarding current billing data and an account-alert module having at least one display interface for reporting time and event sensitive account alerts related to changes in account data due to occurring events or pre-configured time parameters.

A portfolio-tracking module, part of the software suite described above, has a displayable summary interface for enabling viewing and manipulation of multiple categories of aggregated data compiled from a plurality of data sources and accessible through a single interfacing node operated on a data-packet-network. The portfolio-tracking module comprises an interactive main interface accessible through the summary interface, the main interface for listing stocks and investment accounts for viewing, an interactive menu provided within the main interface for selecting views of individual investment accounts, the views appearing within the same or within a secondary interface, an interactive selection interface provided within the main interface for selecting investment accounts for data tracking, a first interactive hyperlink embedded within the main interface for linking the main interface to a secondary interface for viewing tracked information about personal investments, and a second interactive hyperlink embedded within the main interface for linking the main interface to a secondary configuration interface for adding new investment accounts or stocks for tracking. A user working from within the module may interact with selected ones of interactive links for the purpose of invoking a variety of secondary interfaces containing more detailed information about registered investments, financial accounts, and performance data about stocks.

Granularity and accuracy of data available through interaction with the portfolio module described above depends, in part, on the ability to navigate to listed sites representing financial institutions (FI) and to parse the correct data from those sites for return and display to requesting users. In many cases users may access this capability through what is termed a cobrand interface. For example, a user patronizing a popular ISP such as America On-Line (AOL™) may desire to access his or her stock or investment information. It then becomes important to propagate important user actions to any portfolio interfaces in addition to the interface through which the action was initiated.

Therefore, what is clearly needed is a capability of synchronizing portfolio actions such that if an action is performed through an FI site or a particular portfolio interface, the results of the action may be propagated into a main portfolio presentation interface and/or into any subscribed cobrand interfaces.

SUMMARY OF THE INVENTION

In a preferred embodiment of the present invention an account coordination system is provided, comprising an Internet-connected server executing software from a non-transitory, machine-readable medium. The software provides direct linking between the server and two or more financial enterprises hosting each at least one financial account for a specific user and having an interactive interface through which the user may interact with his/her account, direct linking between the server and one or more third-party enterprises providing interactive interfaces through which the user may access and interact with one or more of the financial accounts at the financial enterprises, and tracking functionality whereby the server tracks activity by the user at any of the interactive interfaces through which the user may interact with one of the financial accounts. The server propagates any change made in an account by the user at any one of the interactive interfaces to the sites hosting the other interactive interfaces.

In one embodiment activity by the user comprises opening or closing an account. Also in one embodiment activity by the user comprises depositing or withdrawing funds to or from an account. In some embodiments activity by the user comprises paying a bill or arranging payment terms for an obligation.

In another aspect of the invention a method for account coordination is provided, comprising the steps of (a) direct linking between a server and two or more financial enterprises hosting each at least one financial account for a specific user and having an interactive interface through which the user may interact with his/her account; (b) direct linking between the server and one or more third-party enterprises providing interactive interfaces through which the user may access and interact with one or more of the financial accounts at the financial enterprises; (c) tracking activity by the user at any of the interactive interfaces through which the user may interact with one of the financial accounts; and (d) propagating any change made in an account by the user at any one of the interactive interfaces to the sites hosting the other interactive interfaces.

In one embodiment of the method activity by the user comprises opening or closing an account. Also in one embodiment activity by the user comprises depositing or withdrawing funds to or from an account. In some embodiments activity by the user comprises paying a bill or arranging payment terms for an obligation.

BRIEF DESCRIPTION OF THE DRAWING FIGURES

FIG. 19 is an exemplary screen shot of a secondary interface invoked as a result of interaction with icon 313 of FIG. 18.

FIG. 21 is an exemplary screen shot of a configuration interface for adding and selecting investment accounts and stocks for tracking and reporting according to an embodiment of the present invention.

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
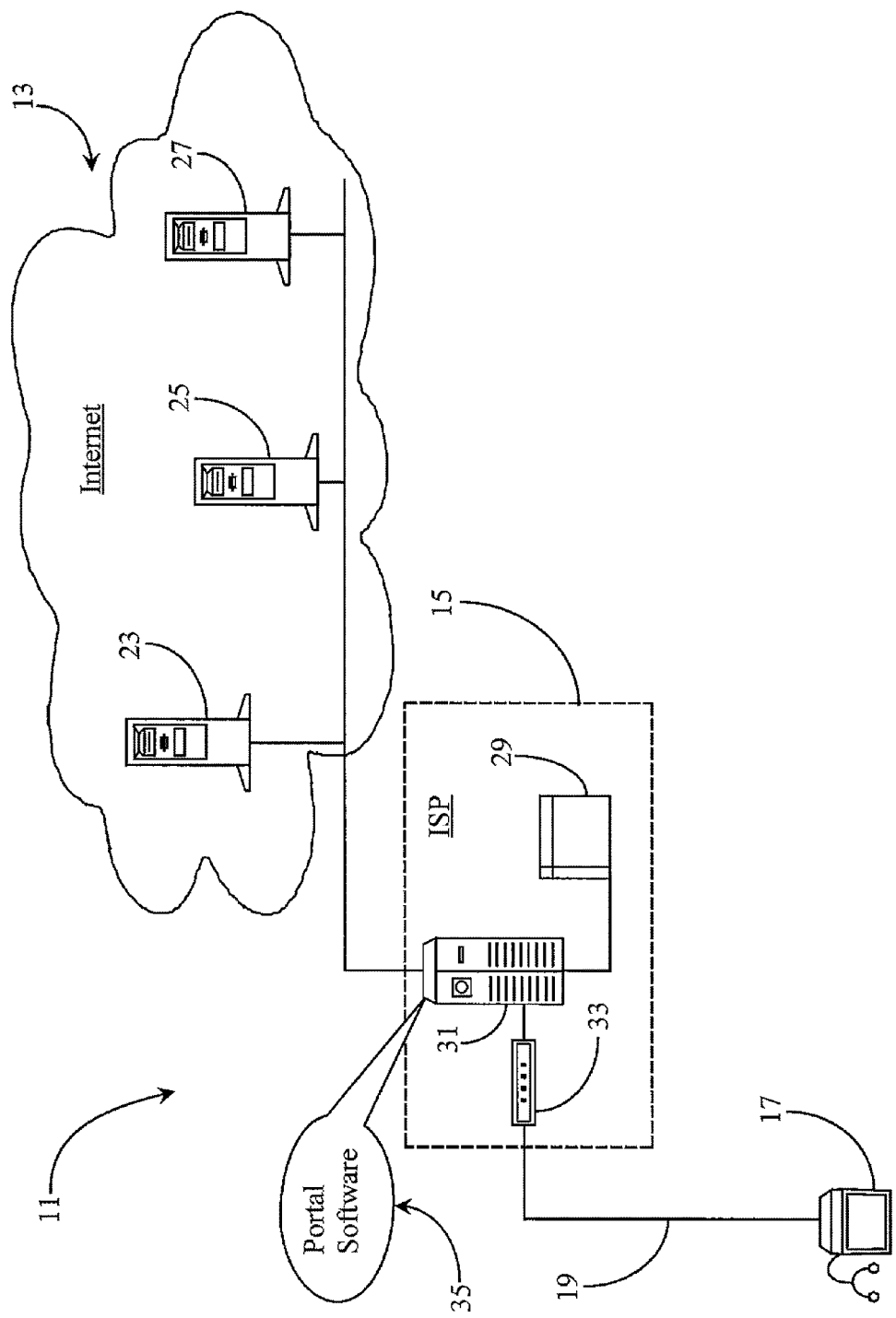
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
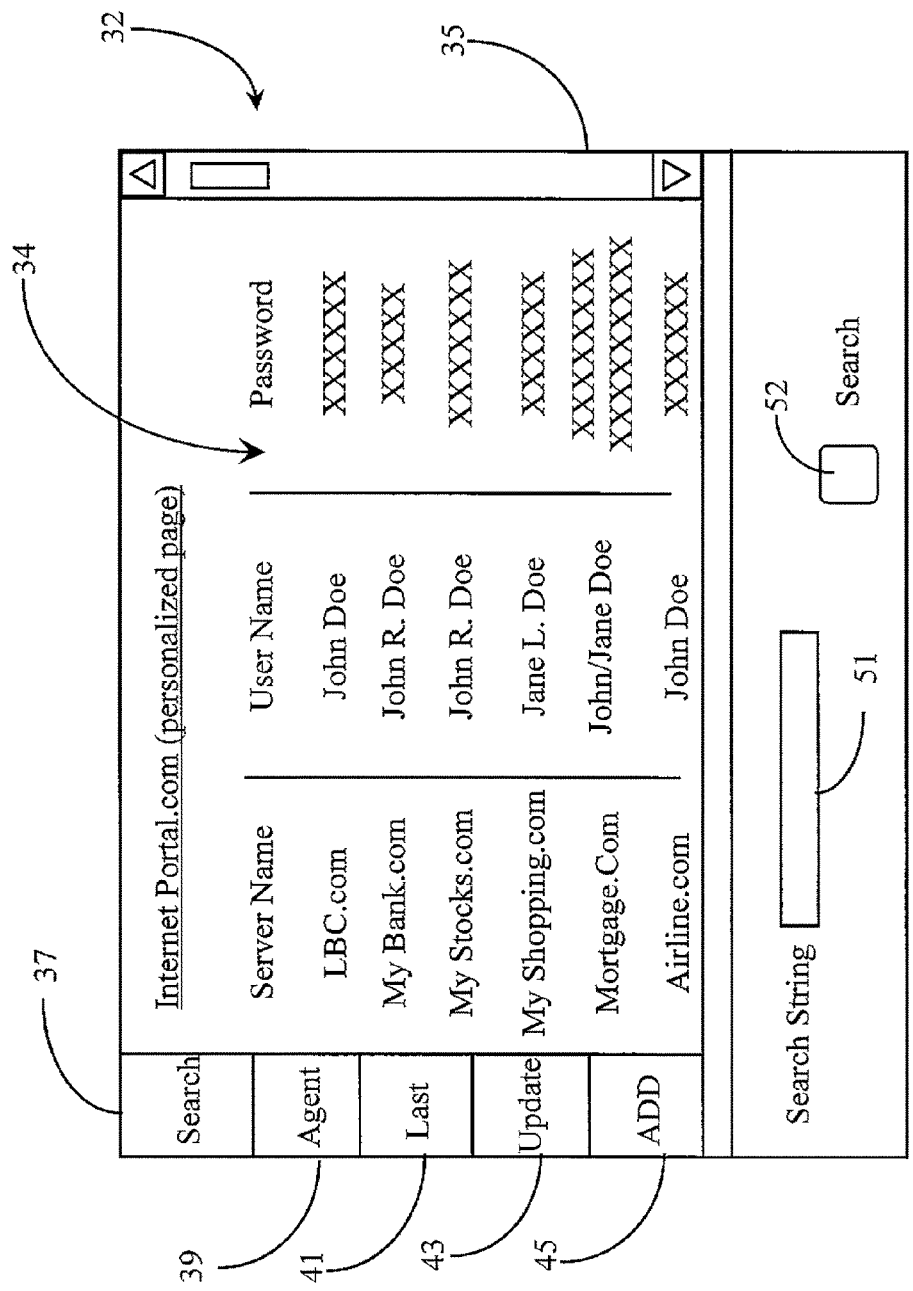
FIG. 2 is an exemplary plan view of a personalized portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide login and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
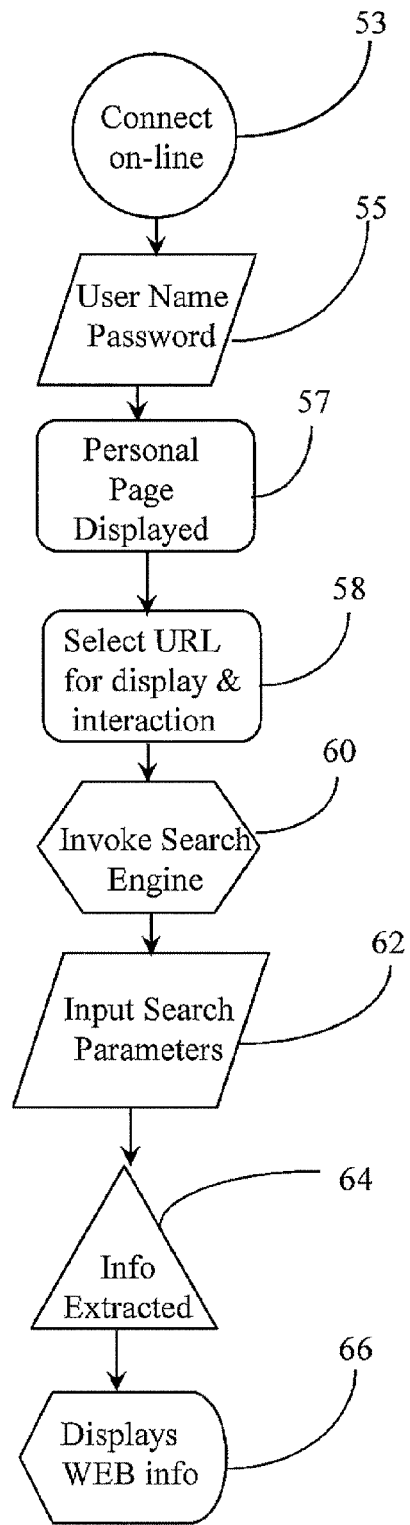
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
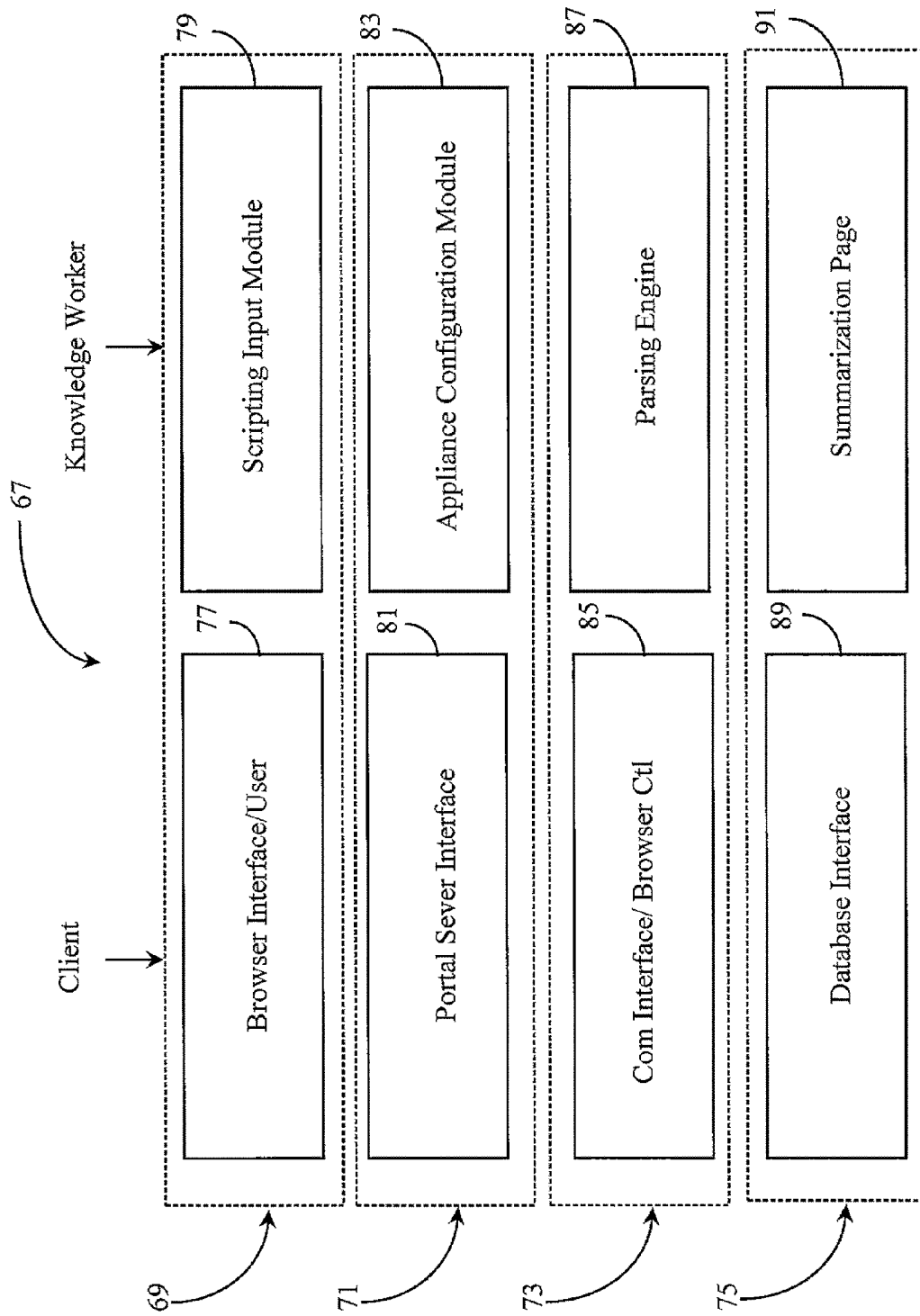
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, in one embodiment, be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform its function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above-mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment, one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives its instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

```
# Site amazon.orders.x - shows status of orders from Amazon
login( 7 );
get( "/exec/obidos/order-list/" );
my @tables = get_tables_containing_text( "Orders:" );
my $order_list = new Yodlee::ObjectHolder( 'orders' );
$order_list->source( 'amazon' );
$order_list->link_info( get_link_info( ) );
my @href_list;
my @container_list;
foreach my $table ( @tables ) {
    my @rows = get_table_rows( );
    foreach my $i ( 0 .. $#rows ) {
        select_row( $i );
        my $text = get_text( $rows[ $i ] );
        next if $text =~ /Orders:|Status/;
```
```
        my @items = get_row_items( );
        next unless @items >= 4;
        my( $order_num, $date, $status );
        select_cell( 1 );
        $order_num = get_cell_text( );
        my $href = get_url_of_first_href( get_cell( ) );
        select_cell( 2 );
        $date = get_cell_text( );
        select_cell( 3 );
        $status = get_cell_text( );
        next unless defined $order_num and defined
        $date and defined $status;
        my $order = new Yodlee::Container( 'orders' );
        $order->order_number( $order_num );
        $order->date( $date );
        $order->status( $status );
        $order_list->push_object( $order );
        if( defined $href) {
            push( @href_list, $href );
            push( @container_list, $order );
    foreach my $i ( 0 .. $#href list ) {
        get( $href_list[ $i ] );
        @tables = get_tables_containing_text( "Items Ordered:" );
    foreach my $table ( @tables ) {
        my @rows =get_table_rows( );
    foreach my $j ( 0 .. $#rows ) {
        select_row( $j );
        my $href = get_url_of_first_href( get_row( ) );
        next unless defined $href;
        my @child_list = get children( get row( ), 'a' );
        next unless defined $child_list[ 0 ];
        my $text = get_text( $child list[ 0 ] );
        $container_list[ $i ]->description( $text );
        }
    }
}
result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment, metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at its own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes its site logic parameters, in which case, the new logic must be accessed and any existing templates must be updated, or a new template may be created for the site. The templates contain site-specific script obtained from the site and stored by the knowledge workers. In one embodiment, companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinate information has not changed. If a new password or the like is required, gatherer 67 through control module 73 may present login or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
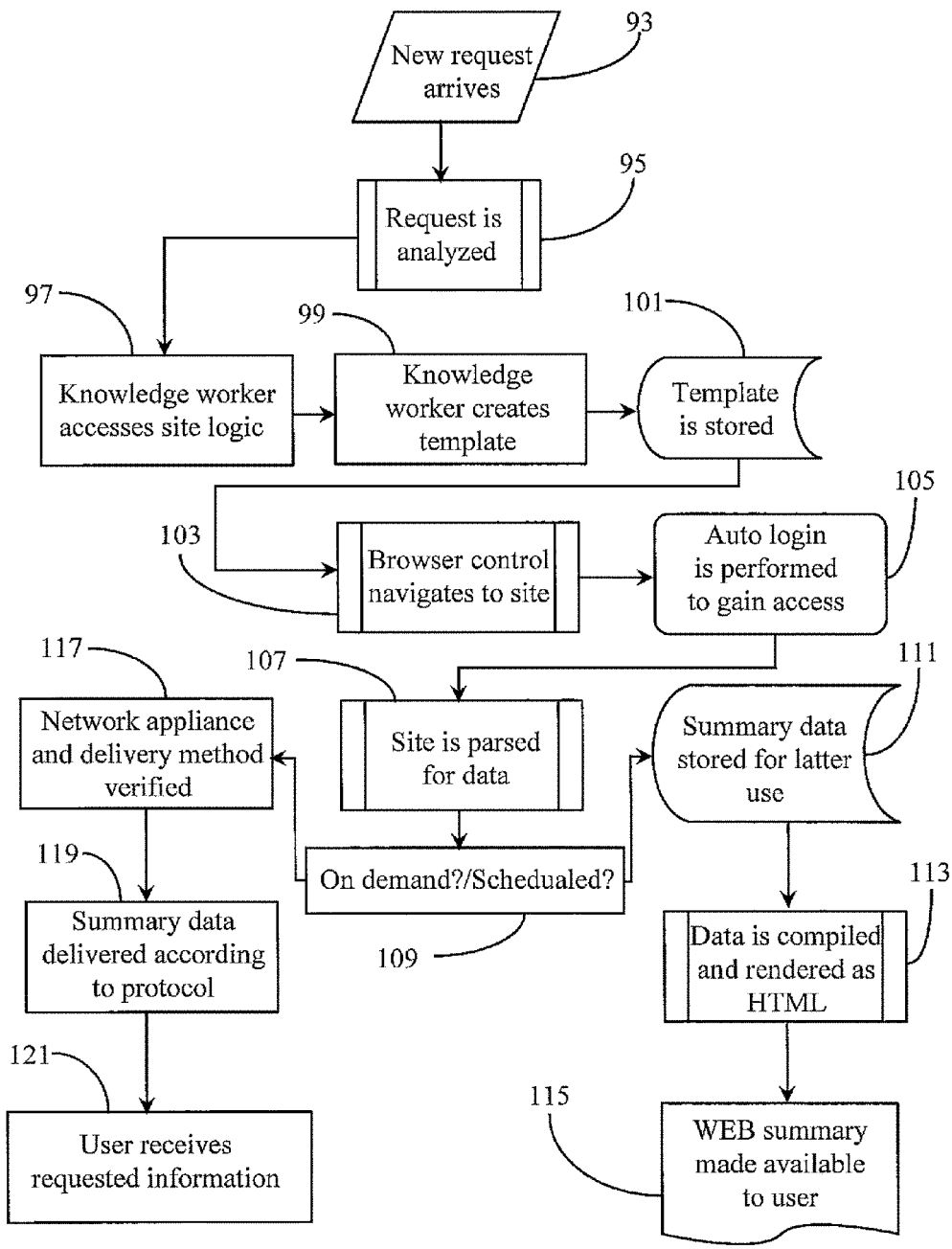
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment, the knowledge worker may notify the browser control to get the template for its next task.

In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB-page in step 115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
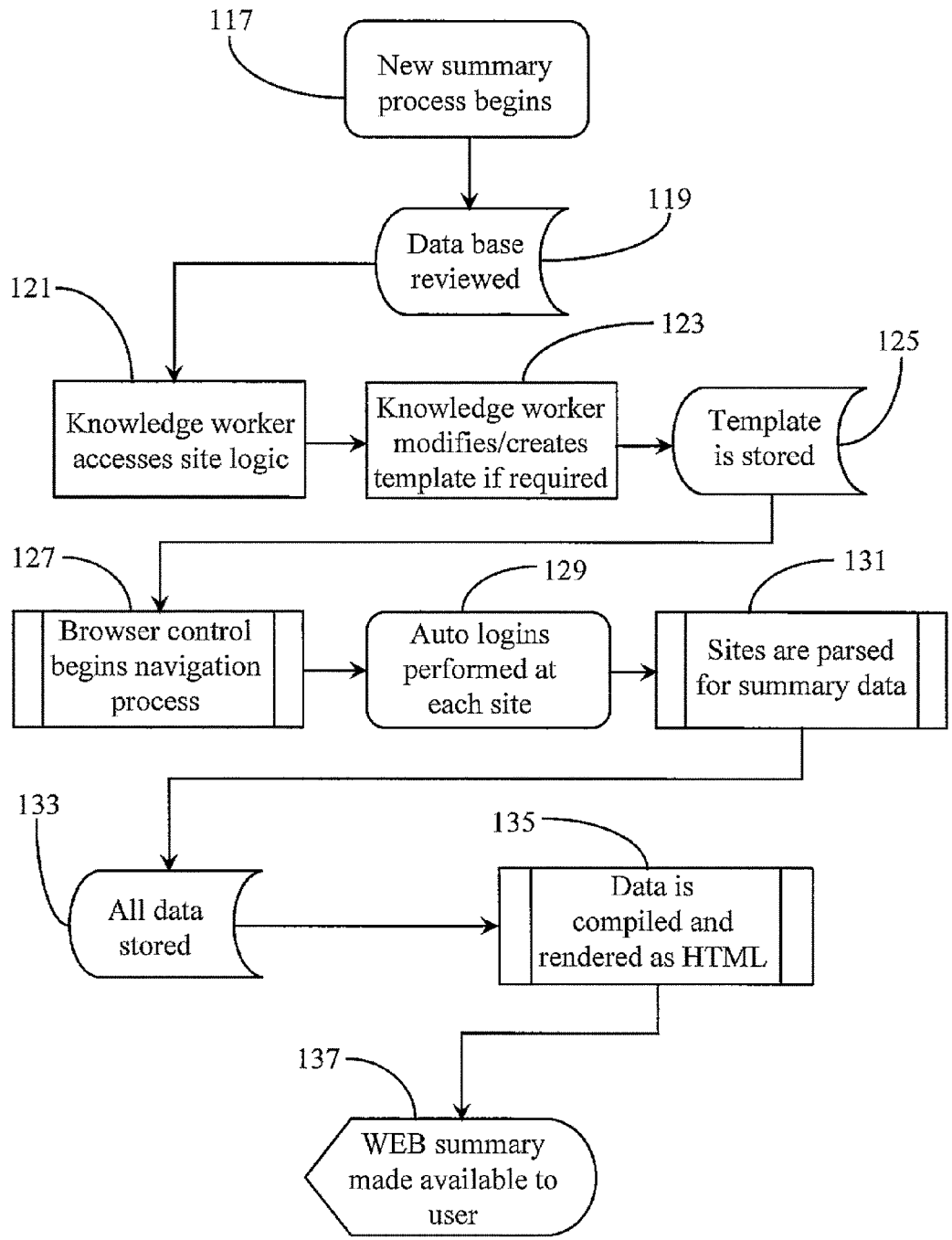
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of it's existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Presenting Meta-Summarized Reports

In another aspect of the present invention, a method is provided largely through unique software wherein summary reports may be ordered and presented to users, the reports reflecting calculated and solution-orientated results. This type of summarizing is termed meta-summarization by the inventors, because it is a summarization over a plurality of data sources. Such a method is described in enabling detail below.

Figure 7:
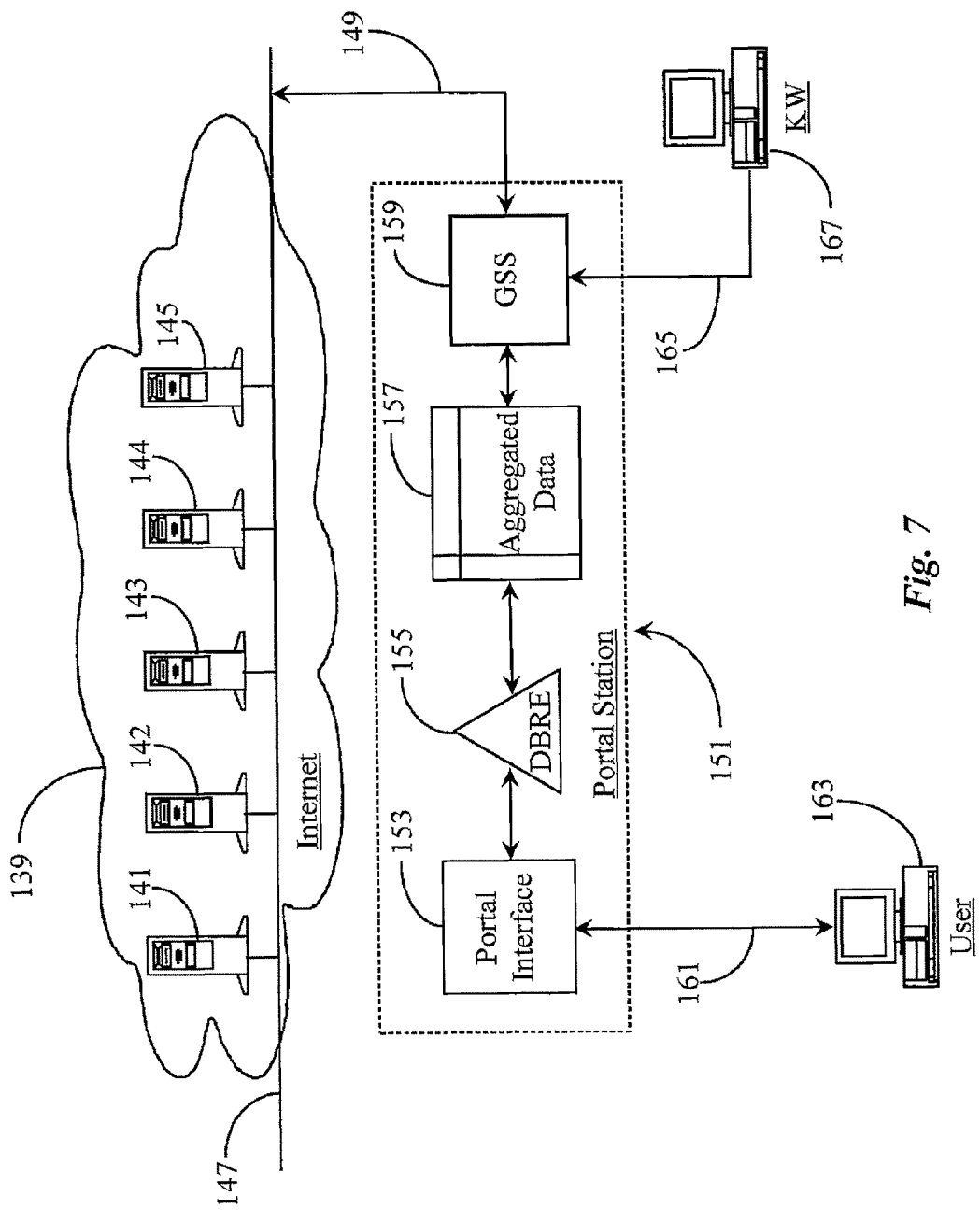
FIG. 7 is an overview of a meta-summarization process according to an embodiment of the present invention.

FIG. 7 is an overview of a meta-summarization process according to an embodiment of the present invention. The term "meta-summary" is used by the inventor in this embodiment also to distinguish the meta-summary process taught herein from the summary process taught above in this specification; in that meta-summarizing involves interpreting and calculating data for reporting a solution-orientated result derived from data retrieved from multiple network sources.

In this embodiment, a portal station 151 is provided and adapted by virtue of software and hardware, to perform WEB-summary and presentation services according to embodiments described in the co-patent applications listed above. Station 151 may be an ISP, a main Internet server, or other network connected server or interface station. In this example, portal station 151 is continuously connected to a source network, which is in this embodiment, the Internet network represented by Internet cloud 139. The above-described network connection is afforded by an Internet-connection line 149 from station 151 to an Internet backbone 147. Internet backbone 147 represents all lines and connections, including sub-nets that make up a global Internet 139.

Portal station 151 has a means provided therein for maintaining a portal interface 153. Portal interface 153 is a file-server interface in this example, however in other embodiments, differing types of network-interface hardware may be substituted therefor. Interface 153 provides hyper-text-transfer protocol (HTTP) pages over an Internet-connection such as path 161 to subscribing users operating such as an illustrated network-adapted PC 163. A user operating PC 163 may go on-line, in this case by such as a dial-up connection, and communicate with portal interface 153 over connection path 161. Connection path 161 may be a normal telephone line, an ISDN line, or another known type of Internet-connection link including wireless connection. A dial-up connection is illustrated herein only as a more common connection method.

A data repository 157 is provided within station 151 and adapted to warehouse aggregated data on behalf of and about a user. Data repository 157 may be part of the same hardware supporting portal interface 153 or it may be a separate hardware implementation connected by a data link. Repository 157 may be of the form of optical storage, or any other known implementation used for storing large amounts of digital data. Repository 157 may be assumed to support varied database programs as may be required to manipulate and organize data or metadata stored therein.

A data gathering sub-system GSS 159 is provided within station 151 and is adapted as a software and hardware implementation capable of navigating data-packet networks, such as Internet 139, upon instruction. GSS 159 represents automated browser control/navigation as described in co-pending patent application Ser. No. 09/523,598. GSS 159 is analogous to navigation layer 73 described in FIG. 4 above.

A plurality of network-connected data sources represented herein by file/data servers 141-145 are illustrated in Internet 139. Servers 141-145 are user-subscribed servers known to portal station 151. For example, servers 141-145 may represent one user's collective WEB-services for banking and investment. Such options include banking, stock trading, retirement account servers, insurance servers, and so on. It is noted here that servers 141-145 are assumed to represent separate WEB-based services subscribed to by one user and are not affiliated with one another. For example, a user operating such as PC 163 would do all of his on-line banking, trading, and investing using servers 141-145 in this example.

In another embodiment, servers 141-145 may represent all of a user's frequented on-line shopping services. The fact that all of servers 141-145 are topically related but not affiliated with one another in this example serves only to aid in explanation of the present invention as will be seen below.

It is taught in the co-pending patent application entitled "Method and Apparatus for Obtaining and Presenting WEB Summaries to Users" that site navigation, parsing data, and returning data to users or storage is enabled, in part, by site-logic templates provided typically by knowledge workers. This aspect is represented herein by a PC 167 adapted for a knowledge worker (KW). A KW working from a station such as PC 167 provides site-logic scripts for navigation to data requested by a user and stored in any one of or all of servers 141-145. Such scripts are provided to GSS 159 over a data link 165. Summary data stored in such as repository 157 is stored for user access. In some cases wherein a user requests immediate data return, data is sent directly to such as portal interface 153 where a user may then access the data immediately.

According to an embodiment of the present invention, a novel database-reporting engine DBRE 155 is provided and adapted to perform formulative processes to aggregated data on behalf of a user. DBRE 155 is in itself a database utility and is in a preferred embodiment a part of the software environment of repository 157. In another embodiment DBRE 155 may be part of the software environment of portal interface 153.

In this embodiment, DBRE 155 acts as a first "gathering agent" and checks repository 157 first for user requested data upon request. User-history records of all user transactions at all of his registered WEB-based services are preferably maintained in repository 157 and are accessible to DBRE 155. In some cases, services such as those represented by servers 141-145 may provided complete transaction histories that may be obtained and stored in repository 157 and updated periodically. In some cases however, such services may not retain history records for users. In this case, a user accessing such services through his or her portal interface 153 may track each transaction over a normal course of time resulting in a history record for transactions at that service that is maintained in repository 157.

In the case of servers 141-145, each contains some form of financial portfolio data connected to one user. For example, server 141 may represent a banking service where a user has a savings account. Server 142 may represent a banking service where the user has a checking account. Server 143 may represent an on-line investment company maintaining a fast-changing portfolio of investments and losses for the particular user. Server 144 may represent a banking company where the user has an individual retirement account (IRA). Server 145 may represent a mortgage company holding data about the users property portfolios. Each site presumably holds current account-status information and a financial history of transactions performed by a particular user.

To illustrate, assume that all financial data particular to one user is provided by or obtained from servers 141-145, aggregated in data repository 157, and updated periodically. A user operating PC 163 may access portal interface 153 by way of Internet connection 161 and request a specific result that involves some or all of the data across multiple servers 141-145. One example would be a user-initiated command "calculate my current net-worth". The resulting meta-summarized report would inform a user of his or her calculated net-worth with all financial data from all financial data-sources (servers 141-145) analyzed in the process of answering the user query.

In this case DBRE 155 utilizes only data that is already aggregated in repository 157. Therefore, it is not specifically required that GSS 159 navigate on behalf of the user in a case where data held in aggregation is current and sufficient to satisfy a user request. However, if a user's particular request, such as the one stated in the above example, requires navigation to one or more of servers 141-145, GSS 159, using site logic provided by KW 167, would navigate to each required site and retrieve the required data. After the required data is aggregated in repository 157, DBRE 155 may analyze the aggregated data and generate an accurate report from the aggregated data based on a user's request.

It will be apparent to one with skill in the art that providing a unique engine such as DBRE 155 on a user-side of repository 157 saves precious bandwidth resource required by individual site navigation and return of data ordered by a user. Added storage space is required in repository 157 for the purpose of storing complete activity histories from multiple WEB services on behalf of users. However, adding such resource and saving bandwidth represents an intelligent implementation in light of the many techniques known in the art for compressing and archiving data. More detail about the function of DBRE 155 is presented below.

Figure 8:
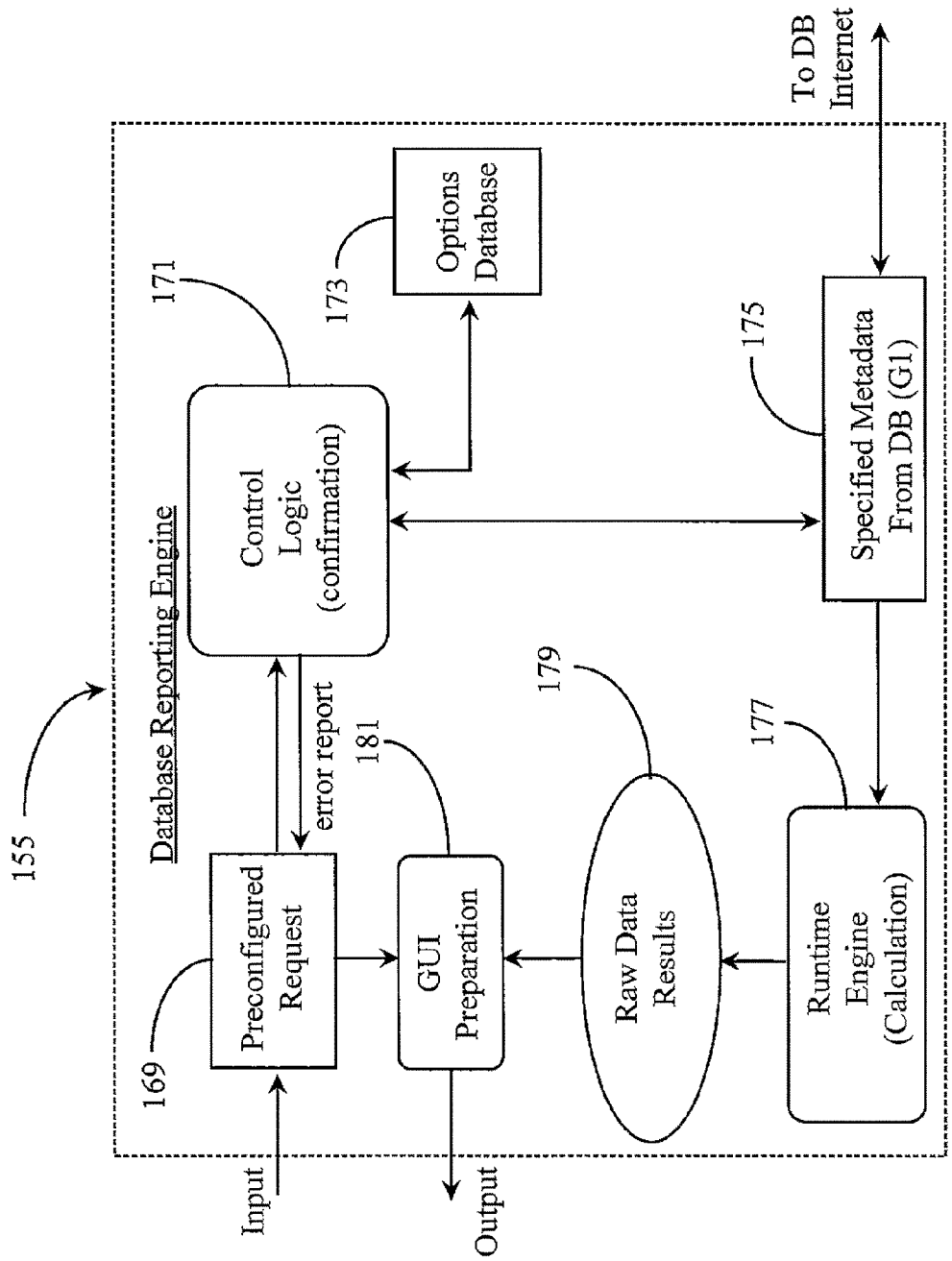
FIG. 8 is a block diagram illustrating components and functions of the database-reporting engine of FIG. 7 according to an embodiment of the present invention.

FIG. 8 is a block diagram illustrating additional detail, components and functions of DBRE 155 of FIG. 7 according to an embodiment of the present invention. DBRE 155 is a functional interface capable of obtaining, analyzing, and preparing data for presentation to a user. As such, it contains certain sub-modules responsible for performing certain required functions. For example, a control-logic module 171 is provided as part of DBRE 155 and adapted to parse and confirm a user's request as well as to insure that a user-selected presentation format is available and appropriate for the type of data result requested by a user. Such options are contained in an options database 173 illustrated as connected to control module 171 by a double arrow representing bi-directional communication.

Options database 173 may be part of DBRE 155 as illustrated herein, or part of repository 157 and made accessible to DBRE 155. In the case of DBRE 155 maintaining its own databases such as options database 173, and a previously described database containing user histories across multiple accounts, then DBRE 155 would be resident in a machine having enough storage memory to hold all required data. Such a machine could be a processor/server. In another embodiment, all stored data is held in repository 157.

DBRE 155 also has a runtime engine 177, which performs data analyzing and calculation in order to form specific data results or solutions for users based on user request. Engine 177 has access to all of the mathematical tools and system knowledge required to perform its objectives which can vary considerably. A knowledge base (not shown) may be used as a source of intelligence for engine 177 as is generally known in the art of configuration models.

Engine 177 performs a wide variety of mathematical functions including such as statistical analysis, summing, averaging, and so on. In one embodiment, algebraic, geometric, and trigonometric functions are also provided for performing more complex calculations. In most cases however, user requests will be geared more toward averaging, summing, predicting probabilities, deriving percentages, and so on. For example, summing multiple bank balances would be a common task. Analyzing on-line spending trends across multiple on-line shopping services would be another example of a common task. A more complicated report might compare shopping trends with income potential and produce a ratio figure along with recommended ways to improve on the ratio without sacrificing needed goods. There are many possibilities.

A graphics user interface (GUI) module 181 is provided within DBRE 155 and adapted to prepare data according to requested format and a requesting display type. GUI module 181 has knowledge of which presentation option was selected from options database 173, and knowledge of the parameters (hardware and software platform) of a particular device or station that will receive a report. It is not required that a report be directed back to an originating device. In some embodiments, a user may direct a meta-summary report to alternative receiving devices over different mediums. This assumes, of course, that the receiving devices and data networks are known to the system.

In practice of the present invention, a user initiates a request illustrated herein as an arrow labeled input to a pre-configured request 169 from such as his or her browser interface. Request 169 is parsed for meaning in control-logic module 171. If there is an error detected in the original request 169, such as missing information or an option selection that is not available, then an error report is immediately sent back to that user as illustrated by the arrow labeled error report. Control-logic module 171 may check options database 173 to determine if an unavailable option was selected and present an alternative available option back with the error report.

Once module 171 has confirmed a request and confirmed a presentation option, it accesses a guard (GI) 175 resident on the client side of such as repository 157 of FIG. 7 to see if there is enough current data stored therein to enable formulation of a valid result. Data obtained from repository 157 of FIG. 1 by way of database interaction is included in guard 175 and passed to engine 177 for processing. If however, a required portion of data is missing from repository 155, GSS 159 of FIG. 7 may be invoked to retrieve the requested data. An error message may, in this case, be sent back to a user informing him of a requirement to navigate for a portion of required data.

All of the data required to return a requested report is funneled into runtime engine 177. All of the appropriate calculations are performed and the resulting data illustrated herein as raw data-results 177 is passed into GUI module 181. GUI module 181 then prepares the result data for presentation to a user illustrated herein as an arrow labeled output.

As described above, a report may be very simple or quite complex, including text and graphical elements as well. In one embodiment, all of the process steps performed on included data may be broken down and reported to a user along with a final result. Presentation options may include spreadsheets, graphs, text reports, pie charts, and so on.

In the example presented above, DBRE 155 is a multi-functional module that may be broken down into cooperating sub-modules. However, this is not required to practice the present invention. One with skill in the art will recognize that there are other orders of modules and distribution paths that may be utilized to accomplish the same function. For example, DBRE 155 (FIG. 7) may interface directly with GSS 159 (FIG. 7) instead of being enhanced for gathering from aggregated data. In this case GSS 159 would first check repository 157 before determining if navigation is required. In another embodiment navigation may be required by default to insure that all data in aggregation is current. There are many possibilities.

Figure 9:
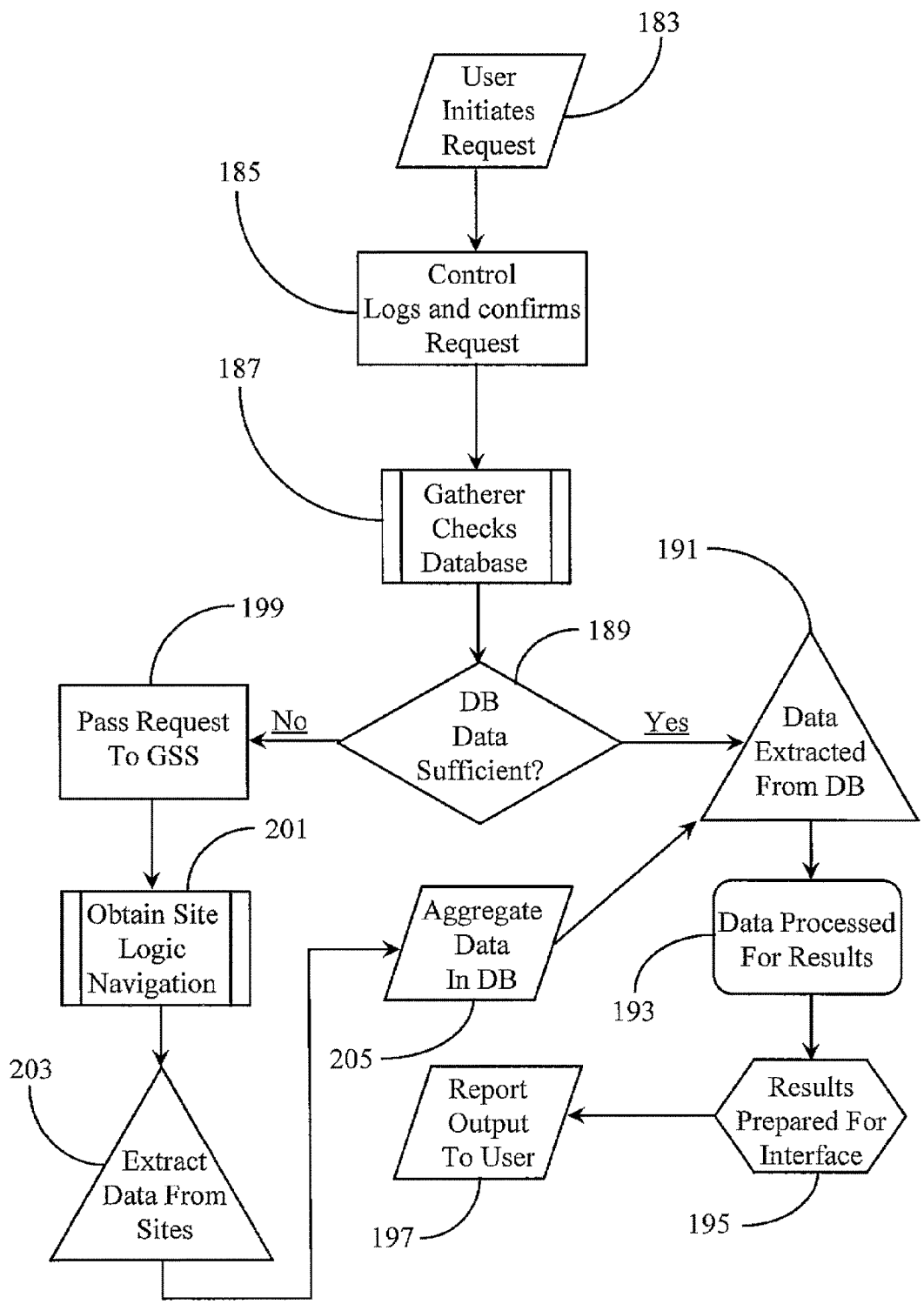
FIG. 9 is a process flow diagram illustrating logical user and system steps for initialization to completion of a meta-summarized report according to an embodiment of the present invention.

FIG. 9 is a process flow diagram illustrating logical user and system steps from initialization to completion of a meta-summarized report according to an embodiment of the present invention. At step 183, a user initiates a meta-summary report request from such as PC 163 of FIG. 7 using a browser/portal interface. A request might be to sum all of my interest earnings from all of my interest bearing accounts over a 1-year period and return a monthly average. In a preferred embodiment such a request may be made in a "natural language" understood by the portal software.

At step 185, control logic registers and confirms feasibility of the original request. This step includes parsing the request, confirming a presentation option, confirming presentation delivery parameters (software, hardware, medium) and so on. Once a request is approved for action, a data gatherer at step 187 accesses the database, such as in repository 157 (FIG. 7) for required data. Such a gatherer, termed a bot by the inventor, may be part of DBRE 155 as illustrated in FIG. 8, or part of GSS 159 of FIG. 7.

At step 189 it is determined whether or not there is sufficient data available in aggregation to complete the request. If the decision is yes, then the required data is extracted from the database (DB) in step 191. At step 193 the extracted data is processed according to tools that accomplish the user's request, which is a solution-orientated result. Text records of processing may also be forwarded to a user if requested. In this way a user might review several steps taken to arrive at a solution-oriented result.

At step 193, the raw result data is prepared according to user-requested presentation options in such as GUI module 181 of FIG. 8. A presentation option may consist of simple text results appearing on a user's portal home page. In one embodiment, a separate WEB page may be constructed that displays varied versions of the same result such as a time chart, a text paragraph explaining the chart, and a table reflecting result values. A meta-summary dealing with an averaged interest rate, as described in an example above, may be presented in a variety of ways. For example, each account and individual result may be listed, followed by a summed result over a particular time span, followed by an average figure over a smaller increment of time. There are no limits to presentation possibilities as long as the appropriate software containers are supported at both ends of the interaction. In most cases, a browser interface supporting full interactive function will be utilized. In step 197, the prepared GUI data is sent to a requesting user such as one operating PC 163 of FIG. 7 over an Internet connection such as connection 161. It should be noted here again that many devices are capable of effecting an interface with DBRE 155 of FIG. 8 and receiving result data. The success of configuring varied devices to the system will depend on provided network and data interfaces.

If in step 189 it is determined that there is not enough data or the right kind of data already in aggregation to complete a request, then the request is passed over to a GSS, such as GSS 159 of FIG. 7 in step 199. In one embodiment gathering is the sole responsibility of GSS 159 as has already been described. In step 201 site logic templates are obtained from such as a KW operating a PC such as PC 167 of FIG. 7. If the navigation templates required are the same as templates that have been previously used, then such templates may be obtained from a connected data store.

At step 203, a GSS such as GSS 159 of FIG. 8 navigates to and extracts data from required WEB sites in order to complete the aggregated data store on behalf of the requesting user. At step 205, the data is passed into aggregation in a database assigned for the purpose in such as repository 157. After all of the required data has been aggregated in step 205, steps 191 through 197 are repeated.

It will be apparent to one with skill in the art that the process steps described above represent a mostly automated or completely automated process. Moreover, there may be other sub-routines added without departing from the spirit and scope of the present invention such as adding a user notification step in the event that in step 189, data is insufficient.

It will also be apparent to one with skill in the art that a process routine such as the one described herein may be altered according to an alternate operating environment without departing from the spirit and scope of the present invention. For example, if a user is interfacing from a wireless device through such as a data center network interface, then added steps may be required to convert data to a format understood on a different network. There are many diverse applications.

Figure 10:
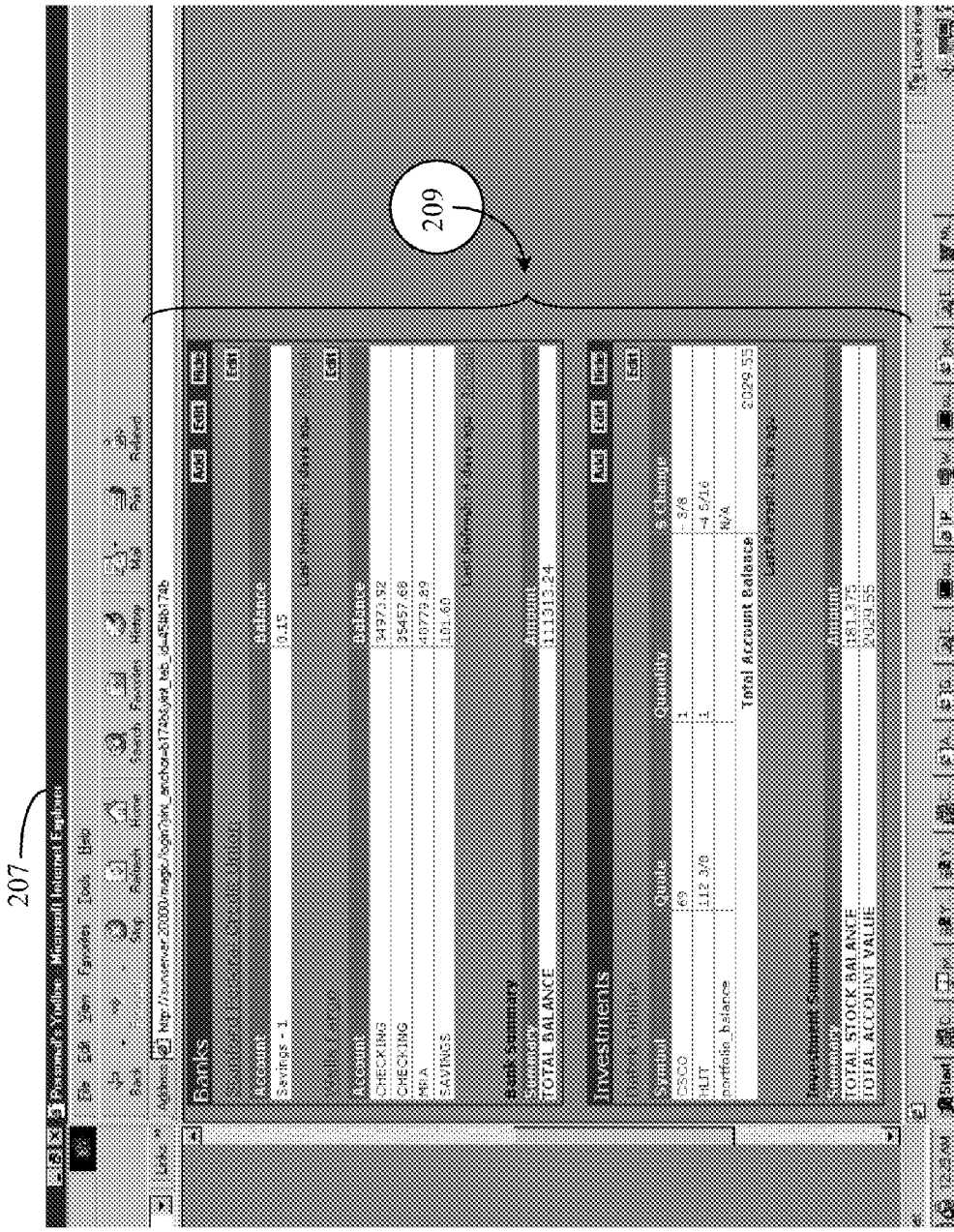
FIG. 10 is a representative view of an actual screen shot of a meta-summarized report on display in a user's browser interface according to an embodiment of the present invention.

FIG. 10 is a representative view of an actual screen shot 207 of a meta-summarized report 209 on display in a user's browser interface according to an embodiment of the present invention. In a more common implementation of the present invention, a user interfaces with such as a portal server by utilizing a common browser interface, many brands of which are known in the art and readily available. In this particular example, a Microsoft™ browser application known as the Internet Explorer™ (IE) is used. However the system of the present invention works with any software interface capable of navigating a data packet network.

Summary report 209 consists of individual bank, investment and account listings complete with the names of the institutions. Summaries of the individually reported information for both bank accounts and stock accounts are found beneath each group listing. Report 209 is a rather simplified example of many graphical possibilities and presentation methods. Depending on the complexity of a request, a meta-summarized report may contain virtually any type of presentation mediums. Some examples include, but the invention is not limited to limited to, Gant charts, time graphs, pie charts, flow charts, text summaries, and so on. In another embodiment, a summarized report may contain interactive options for looking at the same data in different ways, or even calculating further results from the results presented. A user has many options when accomplishing interface with the system of the present invention through a fully functional browser application installed on a powerful PC. Interface through other devices such as personal digital assistant's, cellular telephones, and the like will obviously limit presentation options, however, the use of such devices for interface is possible and may, in some situations, be preferred. Such situations may be business meetings, interviews, and other situations wherein a user may need to access some summary data, but does not have access to his personal computer station. Moreover, such data may be previously ordered and sent to a place other than at his or her personal computer. With appropriate interface to telephony networks, such information may, if directed by a user, be faxed to a meeting place, e-mailed to an associate's e-mail address, and so on. There are many diverse applications, many of which have already been stated.

Multiple Point-Of-Access Summary Interface

According to a preferred embodiment of the present invention, an interactive software interface suite is provided and packaged to enable multi-point access to deeper levels of summary data as well as transaction and direct account access capabilities.

Figure 11:
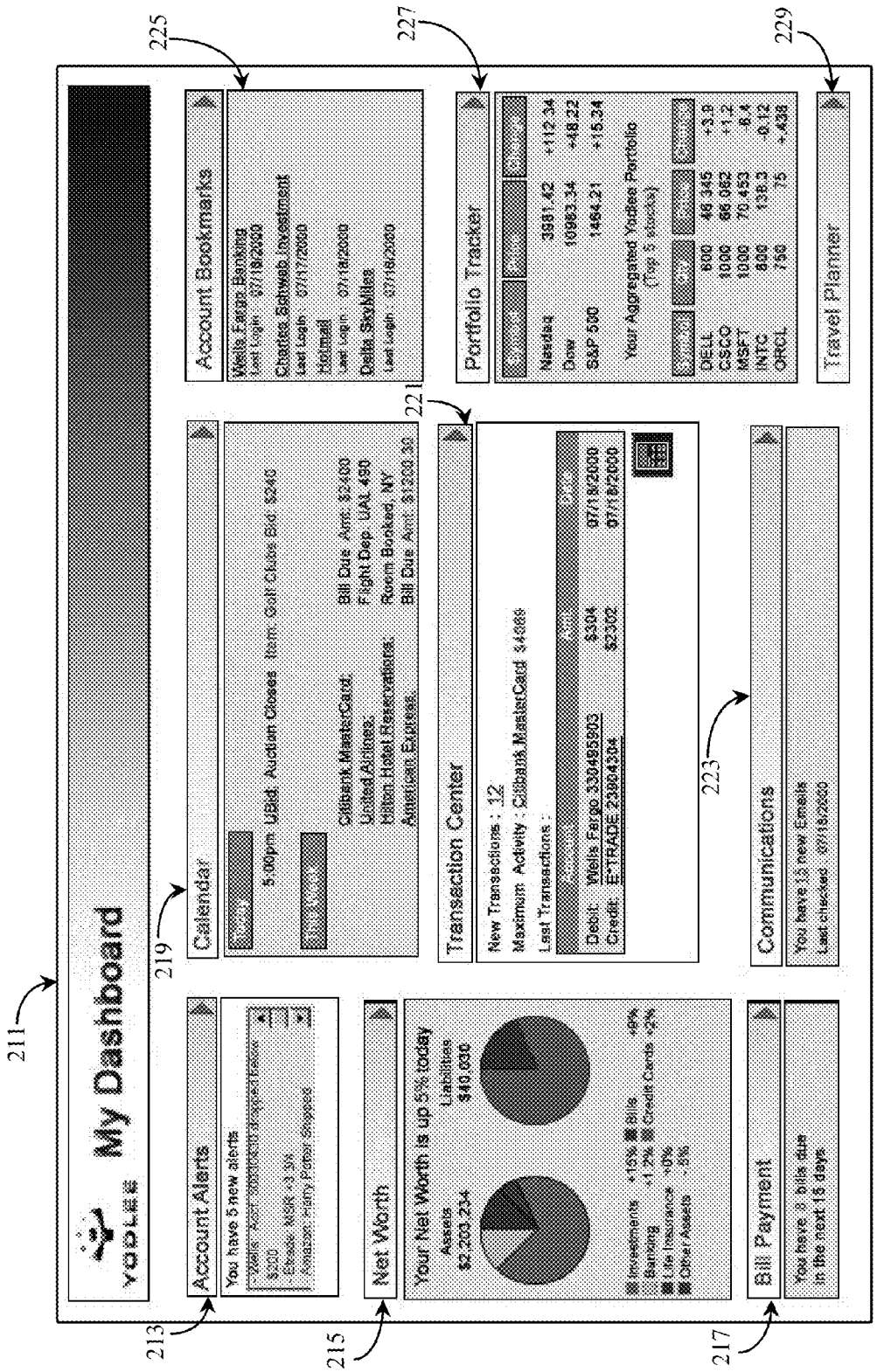
FIG. 11 is an exemplary screen shot of an interactive interface suite for enabling multipoint account management capabilities according to an embodiment of the present invention.

FIG. 11 is an exemplary screen shot of interactive interface suite 211 for enabling multipoint account management capabilities according to an embodiment of the present invention. Interface suite 211, termed a Dashboard by the inventors, provides a single interactive center for viewing summary data and for performing various transaction tasks related to data available through the interface. Interface 211 is described as a suite because it is composed of a plurality of sub-interfaces categorized in general by the type of data and functionality available through interaction with them. The plurality of sub-interfaces forming interface 211 are, in this example, packaged in the form of a single dynamic Web page using hyper-text-markup-language (HTML).

Referring now to FIG. 10, interface 211 replaces interfaces 207 as a more functional, organized, and user-friendly interactive interface for receiving summary and solution-oriented data.

Referring now to FIG. 7, exemplary user 163 accesses services by interfacing with portal interface 153 via Internet access line 161. Interface 211 is adapted to be served to user 163 in the form of a Web page that his dynamic nature meaning that it is continually updated with new information. Referring now to FIG. 8, database reporting-engine 155 provides the data preparation and calculative services necessary for enabling the enhanced display capabilities of interface 211 and related sub-interfaces.

In this example, interface 211 is made up of 9 sub-modules each module providing a different class of functionality. An Account Alerts module 213 is provided within interface 211 and adapted to display various types of user-configured alerts that may be applied to a wide range of user account types. A Net Worth module 215 is provided within interface 211 and adapted to report a user's net worth information as determined through calculation related to data associated with all of the user's financially related accounts, assets, and financial activities. Module 215 is illustrated in this example as presenting dynamic graphics in the form of pie charts describing a user's current assets and liabilities.

A bill Payment module 217 is provided within interface 211 and adapted for user configuration to report parameters related to bill payment. A Calendar module 219 is provided with interface 211 and adapted to hold all of a user's pending data-sensitive information. A Transaction Center module 221 is provided within interface 211 and adapted to list and summarize all of a user's online and manually input transactions. A Communications module 223 is provided within interface 211 and adapted to report parameters associated with a user's online communications applications.

An Account Bookmarks module 225 is provided within interface 211 and adapted to list all of a user's Web services in the form of hyperlinks, which are enhanced with automatic login functionality (known to inventor). A Portfolio Tracker module 227 is provided within interface 211 and adapted to follow and report parameters related to the user's favorite stocks and other investment vehicles. A Travel Planning module 229 is provided within interface 211 and adapted to enable a user to initiate, create, and manage travel itineraries including all parameters related to ticket purchase, hotel accommodations, car rentals, and other related tasks.

All of sub-modules 213-229 are interactive in the sense that a user invokes each module in order to obtain more detailed information regarding the types and classes of dynamic data handled by the invoked module. Therefore, data visible on the "face" of each module represents initial summarized updates that are exploitable for further details.

In one embodiment, further interactive enhancement is included in sub-modules 213-229 that list service providers maintaining accounts for users. From within these modules, the actual login service pages of those entities are accessible through provision of the appropriate hyperlinks to those pages. In addition to providing direct access to a user's service-providing entities through modules 213-229, hyperlinks to one or more configuration utilities associated with one or more modules servicing a particular class or type of data may also be provided. Another enhancement provided by interface 211 is that various sub-modules exemplified herein are interlinked with each other through database reporting engine 155 of FIG. 8 such that they may share overlapping data and cooperate with each other in prioritized or other fashions with regard to the presentation and reporting of data that may be associated or linked to more than one of the individual modules.

Referring now back to FIG. 8, data input leading into request module 169 of database reporting engine 155 may contain configuration input and request data from one or more utilities (not shown) that may, in preferred embodiments, be accessible through interface 211 of FIG. 11. Output from GUI preparation module 181 is channeled for display into the proper sub-module or modules ordering the data. Any particular display characteristics provided as options are stored in options database 173 and the products of user pre-configuration.

Referring now back to FIG. 11, Account Alert module 213 informs a user upon initial display of interface 211 of, in this case, 5 new alerts related to various types of accounts. For example, a listed Wells Fargo™ balance is shown to have dropped below a $200.00 balance threshold. Another listed alert informs a user that a Harry Potter© book ordered from Amazon™ has shipped. Alerts module 213 may be pre-configured to provide virtually any type of time or event-sensitive alert that a user may desire. By clicking on any of the listed alerts, a user may be hyper-linked to the appropriate sub-module responsible for the detailed data and account entity associated with the alert.

Net Worth module 215 uses the calculative and logic functions provided by database reporting engine 155 of FIG. 8 to present a periodic report summary of a user's current net worth. In this example, both assets and liabilities are graphically illustrated and color-coded to individual categories of assets or liability. It is important to note herein, that data results presented in module 215 may be derived from virtually every online account accessible to a user through interface 211. In one embodiment, the color-coded categories are interactive such that by clicking on them as hyperlinks sends a user to an appropriate sub-module wherein more detailed information is provided. Also in this embodiment, by clicking on one of the graphics, a pop-up display containing detailed report figures may be displayed. It is also noted herein, that all of the listed sub-modules 213-229 have interactive navigation arrows installed on their faces, the arrows providing navigation to more detailed levels of data which are displayed in secondary interfaces associated with the main module invoked. More detail regarding Net Worth module 215 is provided later in this specification.

Bill Payment module 217 informs a user, in this example, that he or she currently has 8 bills due within the next 15 days. By clicking on the provided navigation arrow, a more detailed account listing each bill by entity and account number and due date may be presented in a secondary interface associated with module 217. In this aspect, it is noted that the payment module 217 is interlinked with Calendar module 219 and may share overlapping data.

Calendar module 219 provides first, a summary of items to occur on the day accessed and items related to calendar events within the current running week. By clicking on the navigation arrow provided, a secondary interface is served containing a more detailed calendar display. More detail about Calendar module 219 will be provided later in this specification.

Transaction Center module 221 informs a user of new transactions occurring since the last time of access. In this case there are twelve new transactions noted. A maximum activity item is displayed on the face of Transaction Center module 221 and related to a particular account, in this case, a MasterCard™ account that has seen the most transaction activity during a pre-configured timeframe, or since the last time of access. Also shown on the face of Transaction Center module 221, is a section listing last transactions. In this action, there are two transactions listed. A debit transaction is listed including an account provider and account number, the amount of the transaction, and the date of the transaction. A credit transaction is listed that includes the same account, amount, and date parameters of the debit transaction. By clicking on the navigation arrow provided on the face of Transaction Center module 221, a user may navigate to a secondary interface providing additional detail. More detail about Transaction Center module 221 will be provided later in this specification.

Communications module 223 alerts a user, in this case, of a quantity of new e-mails. In this case, there are fifteen new e-mails listed. In one embodiment the fifteen e-mails listed may be generic to one e-mail account. In another embodiment, the fifteen e-mails listed may source from various accounts. By clicking on the navigation arrow on Communications module 223, a secondary interface will appear containing listed accounts. By clicking on one of the accounts listed, a user may invoke that particular e-mail interface and receive any associated e-mails through that interface. If only one e-mail account is configured to Communications module 223, then clicking on the navigation arrow will simply bring up that account software.

Account Bookmarks module 225 provides a list of URLs to a user's registered accounts along with a date listing the last time each account was accessed. By clicking on the navigation arrow provided on the face of Account Bookmarks module 225, a user may invoke the secondary interface containing a more detailed rendering of account data.

Portfolio Tracker module 227 provides a summary view of the latest activity regarding a user's chosen stock symbols. Module 227 also provides a current summary regarding the top five stocks, in this example, contained in a user's stock portfolio. By clicking on the navigation arrow provided on the face of Tracker module 227, a user may invoke the secondary interface rendering much more detail. Similarly, clicking on any of the listed stock symbols may invoke the secondary interface dedicated to that particular symbol, the interface containing much more information.

Travel Planner module 229 provides a tool for a user to invoke when it is desired to create travel plans. By clicking on the navigation arrow provided on the face of the interface, a user may invoke a secondary interface containing a configuration utility for ordering and submitting tasks related to purchasing airline tickets, booking a hotel room, arranging a car rental, and any other travel related tasks. It is noted herein, that secondary interfaces associated with the above-described modules are, in many embodiments, utilities wherein a user may create and submit requests for task performance related to the class of data covered by a particular module. In a preferred embodiment, such utility tools enable proxy performance of online tasks. Still, hyperlinks to actual web sites may also be provided such that a user may navigate to and manually perform a task at the actual site invoked.

It will be apparent to one with skill in the art that interface 211 and associated modules 213-229 may be provided of a different look and feel as well as of differing content and data classification without departing from the spirit and scope of the present invention. The unique capability loaded into interface 211 of enabling performance of various proxy tasks, integrating solution-oriented data between more than one module of interface 211, and providing site-access to associated sites through multiple points of entry represents a level of novelty not known in current-art or prior-art interfaces. Furthermore, the unique proxy capabilities performed by the data compilation, aggregation, and summary system, known to the inventor, are fully accessible through interface 211 providing a level of user-friendliness heretofore not known in the art.

Figure 12:
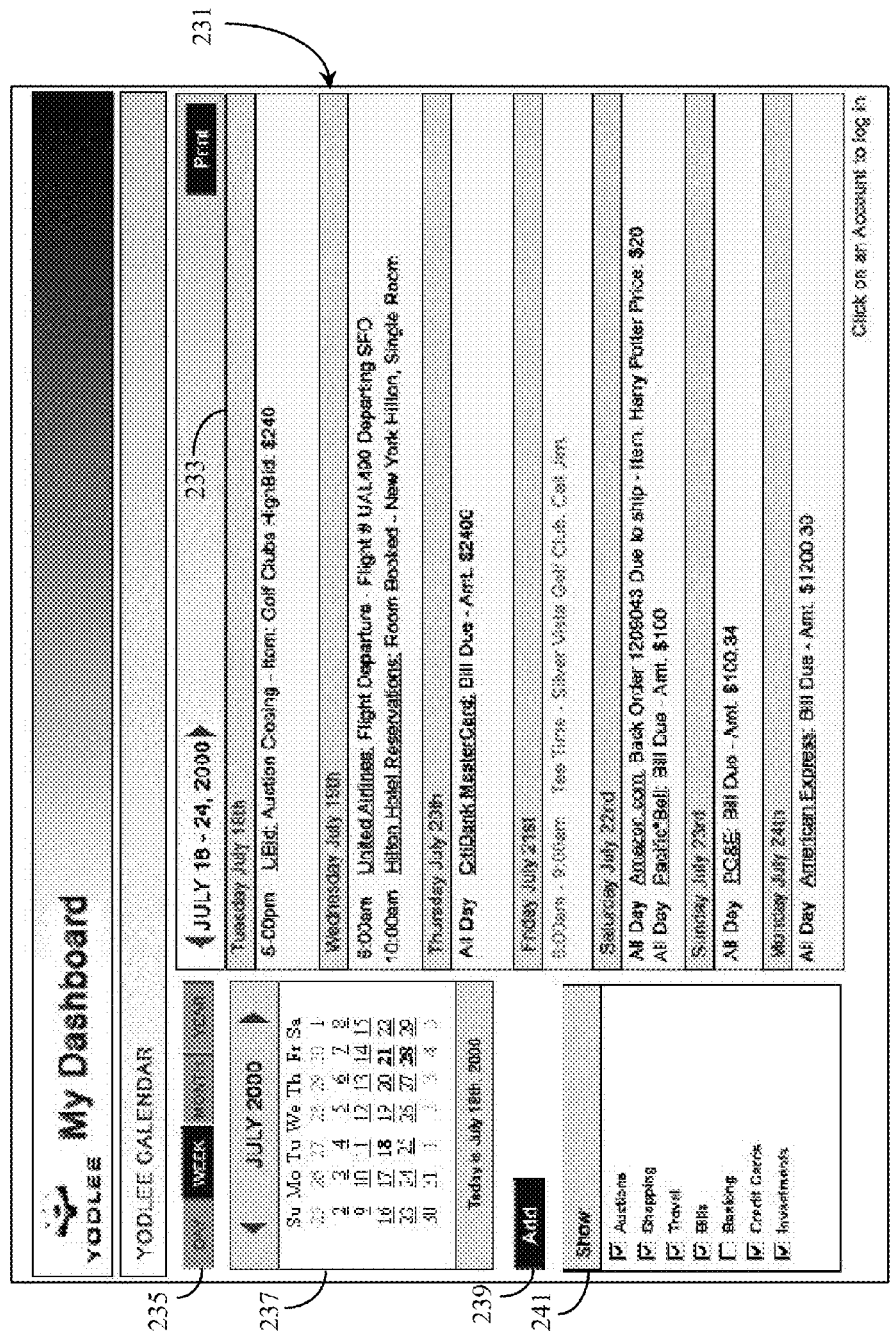
FIG. 12 is an exemplary screen shot of a secondary interface invoked as a result of user interaction with module 219 of FIG. 11 according to an embodiment of the present invention.

FIG. 12 is an exemplary screen shot of a secondary interface 231 invoked as a result of user interaction with module 219 of FIG. 11 according to an embodiment of the present invention. Secondary interface 231 is a detailed calendar utility accessible by invoking Calendar module 219 described in FIG. 11 above. Interface 231 is interactive according to a variety of provided options.

A resolution toolbar 235 is provided within interface 231 and adapted to enable a user to view various calendar resolutions of day, week, month, and year. In this example, interface 231 is displaying data associated with a particular calendar week (Jul. 18-24, 2000) as indicated.

A time-sensitive calendar bookmark window 237 is provided within interface 231 and adapted to show the current day of the current month of the current year. An interactive ad button 239 is provided within interface 231 and adapted to enable a user to enter a new calendar item such as an appointment, task, or other pending item. By invoking ad button 239, an interactive utility (not shown) for making calendar additions appears. Such utility contains all of the required fields and dialog options necessary for making correct calendar additions for later display within interface 231.

A show-item option window 241 is provided within interface 231 and adapted to enable a user to select specific categories of calendar entries to view within interface 231. In this example, the categories auctions, shopping, travel, bills, banking, credit cards, and investments are listed within window 241. The only category not selected for view is the category of banking Therefore, existing calendar entries for the remaining categories, which are selected, appear as visible within interface 231. It is noted herein that calendar items pertaining to all selected categories within window 241 are restricted to items pending within the week of Jul. 18-24, 2000 has ordered by the options selected in resolution toolbar 235.

A summary view section 233 is provided within interface 231 and details actual pending calendar items existing within the time frame of Jul. 18-24, 2000 as ordered by window 241 and toolbar 235. In this example, the summary view lists the time and day of each pending item along with a summary description of each item. It is noted herein that titles of entities associated to each pending item listed in section 233 are interactive in that by clicking on them, further detail about the pending item is displayed.

Calendar interface 231, in a preferred embodiment, is cross-linked with other modules such that data incorporated therein may be affected by actions performed in other modules. For example, if a user pays a bill through the payment module 217 of FIG. 11, and that particular bill was listed as a pending calendar item within interface 231, then the action of paying the bill through module 217 results in automatic deletion of the appropriate item entry in interface 231. Such interoperability is achieved through background application-program-interfacing (API) with database reporting engine 155 of FIG. 8.

Figure 13:
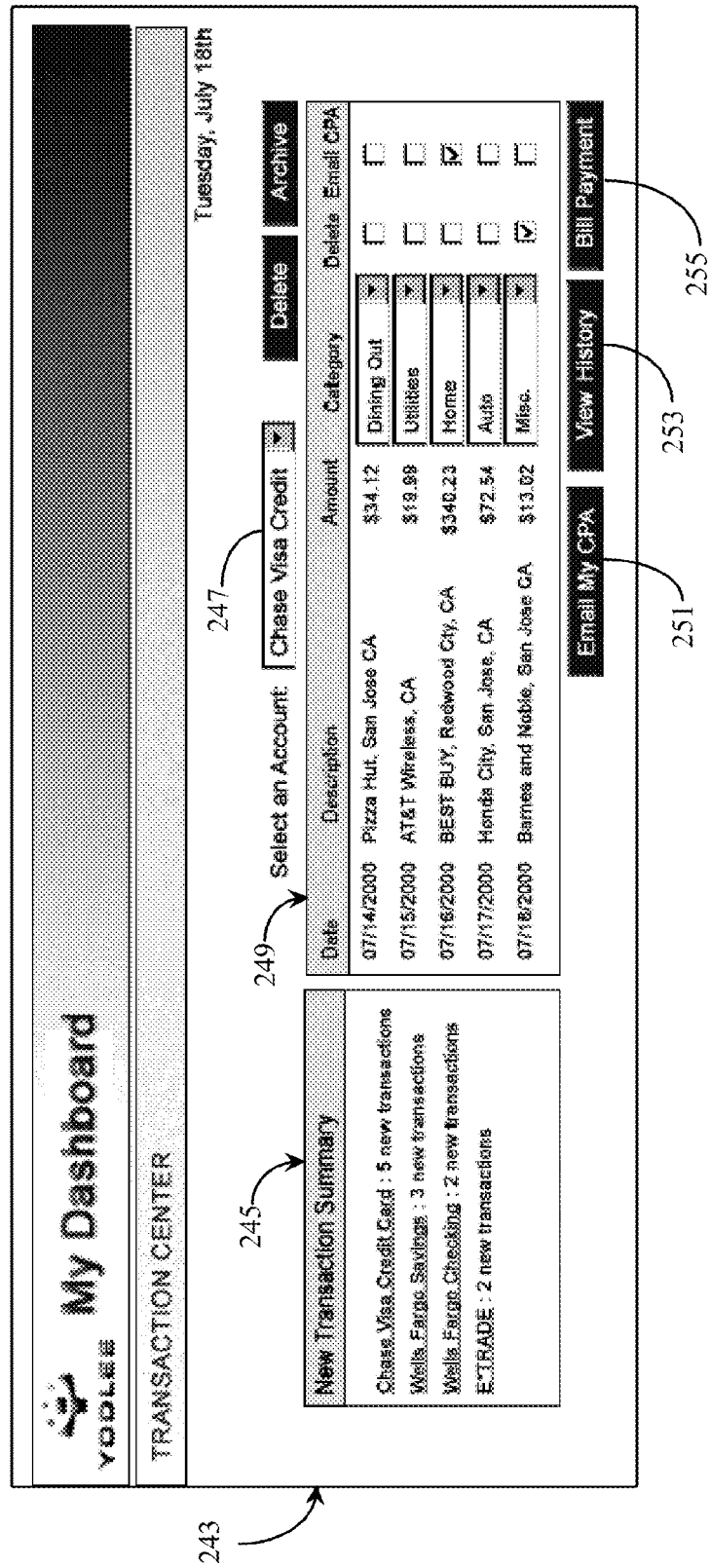
FIG. 13 is an exemplary screen shot of a secondary interface resulting from invocation of transaction center module 221 of FIG. 11 according to an embodiment of the present invention.

FIG. 13 is an exemplary screen shot of a secondary interface 243 resulting from invocation of Transaction Center module 221 of FIG. 11 according to an embodiment of the present invention. Interface 243 is an interactive interface providing a more detailed summary view of transaction data associated with a user's registered accounts. Interface 243 may be thought of as an interactive utility that enables a user to categorize all online transactions as well as off-line transactions into a simple user interface. Interface 243 is both a summary reporting tool and a transaction entry utility.

It is noted herein that interface 243 is provided in the form of an HTML interface. In this example, all of the described interfaces are displayed as HTML interfaces. However, this is not specifically required in order to practice the present invention. Interface 211 of FIG. 11 and all associated interface modules and secondary interfaces may be provided using other markup languages and programming techniques. Furthermore, much tailoring may be provided in order to adapt such interfaces to display in accordance to rules and protocols of a variety of data-access devices. For example, scaled-down versions for devices that use web clipper applications and many browsers can be provided.

Referring now back to FIG. 13, New Transactions Summary window 245 is provided within secondary interface 243 and adapted to display quantities of new transactions categorized to associated accounts. New transactions are identified, in this example, as any new transactions that have occurred since the last time of update or sense the last time of user access of interface 243. There are four accounts listed by title with each account associated with the specific quantity of associated new transactions discovered.

A scroll-down menu 247 is provided within secondary interface 243 and adapted to list all of the user's registered accounts in an interactive fashion such that selecting one of the items contained in menu 247 invokes a transaction history report exemplified herein by a history window 249. Therefore, in this example there are five transactions associated with the selected account (Chase™ Visa™ Credit). In this example, the five detailed account transactions listed in window 249 by the five new transactions reported for the same account in window 245. It will be apparent to one with skill in the art that there may be more registered accounts listed in menu 247 than are shown in summary window 245 without departing from the spirit and scope of the present invention. In this example, window 249 simply details new transactions reported in window 245.

The above-described detail of the new transactions listed in window 249 includes date, description, amount of transaction, and category. A user using a scroll-down category menu containing a list of category options may assign category detail associated with any transaction. In this way, transactions may be uniformly categorized for tax and other organizational purposes. Action items are also reported within history window 249 such as for deleting a transaction and for notification that an e-mail regarding a specific transaction was sent to a certified-public-accountant (CPA) for tax or other accounting purposes.

Other interactive options provided within secondary interface 243 include a manual delete option for manually deleting a transaction, and an archive access option for accessing archived transaction lists. Still another options include CPA-notification option 251, a view-history option 253, and a bill-payment option 255. Bill payment option 255 interlinks with bill-payment module 217 of FIG. 11, which is a utility in enabling a user to perform online bill payment.

It will be apparent to one with skill in the art that interface 243 may be provided of a different look, feel and function than that which is illustrated herein without departing from the spirit and scope of the present invention. For example, Summary window 245 may be adapted simply to provide a pre-configured amount of latest transactions without regard to system update or user access. Similarly, Summary window 245 may list all of a user's registered accounts and quantities of latest transactions instead of just those having new transactions discovered since a last update. Moreover, transactional histories may be organized and accessible according to account, transaction category, and the like.

Figure 14:
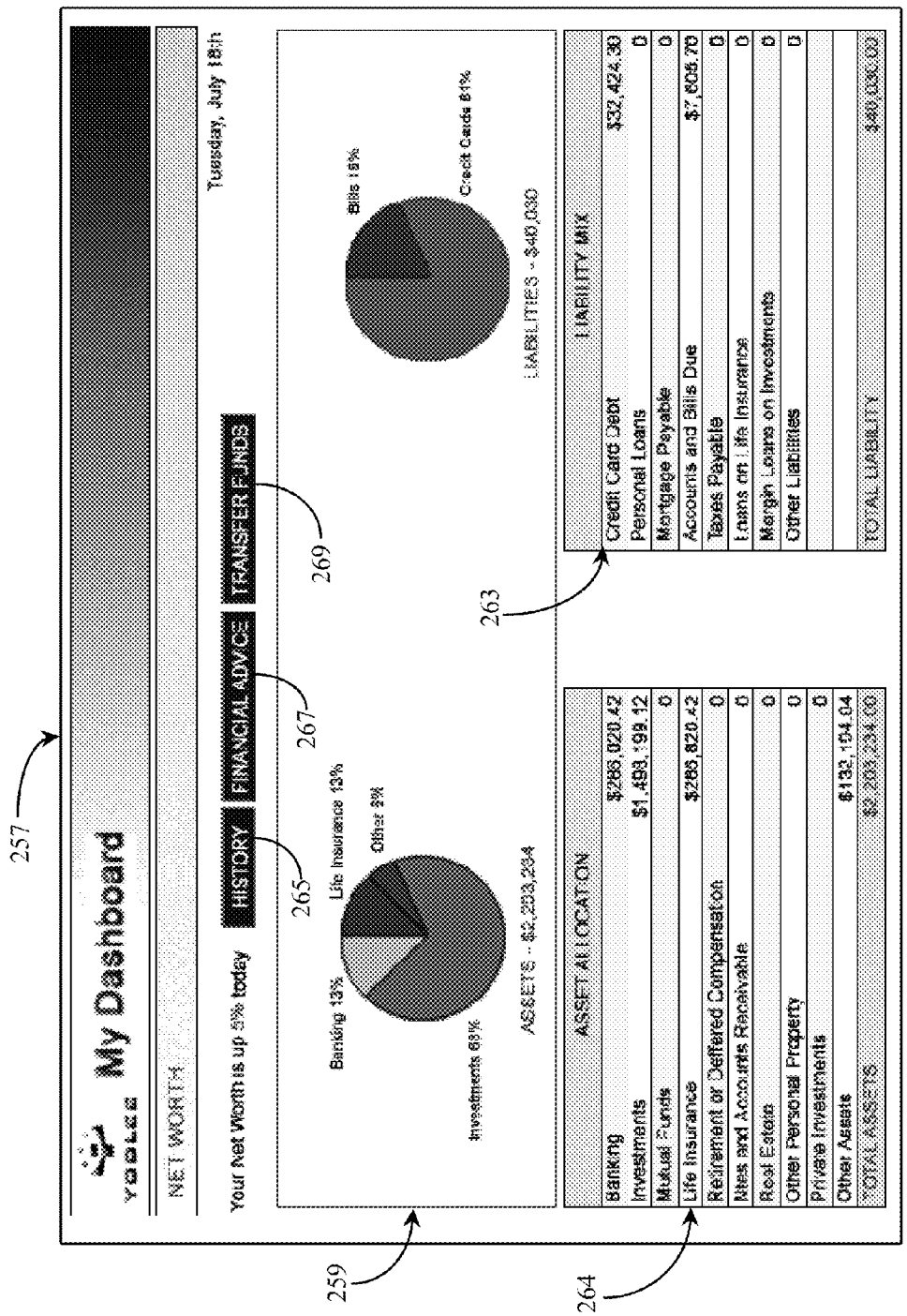
FIG. 14 is an exemplary screen shot of a secondary interface resulting from invocation of network module 215 of FIG. 11.

FIG. 14 is an exemplary screen shot of a secondary interface 257 resulting from invocation of Net Worth module 215 of FIG. 11. Interface 257 provides a more detailed view of a net worth report summarized with graphic pie charts on the face of module 215 of FIG. 11. In this view, the graphic pie charts of module 215 are visible within a provided graphics window 259. Window 259 represents a display option such as was described with reference to FIG. 8 and options a database 173. Other types of graphical representation may be utilized other than the pie charts exemplified herein. In this example, in addition to the pie charts and associated total figures, which are also represented on the face of module 215 as a summary view, actual percentages of data making up the charts are included. An Asset-Allocation window 264 is provided within interface 257 and adapted to list all of the data categories associated with asset computation and their respective totals. A Liability Mix window 263 is provided within interface 257 and adapted to list all of a user's personal financial liabilities considered in assessing a total liability. As can be seen in this example, Windows 264 and 263 are simply report mechanisms reflecting more detail associated with the graphic representation illustrated in window 259.

Net Worth interface 257 is a unique reporting vehicle that is able to provide a user with up-to-date renditions of that user's current net worth. Such a tool enables a user to modify his or her transactional behavior so as to benefit his or her total Net Worth. An interactive History button 265 is provided within interface 257 and adapted to enable a user to view net worth history over a span of time. Such a history report may be presented in the form of a graph indicating value on one axis and time on the other axis.

An interactive Financial Advice button 267 is provided within interface 257 and adapted to enable a user to obtain financial advice in the form of system recommendations and/or advice from a live financial consultant having access to the user's portfolio and transactional data. An interactive Transfer Funds button 269 is provided within interface 257 and adapted as a utility in enabling the user to engage in funds transfer activity associated with registered accounts. It is noted herein that funds transfer activities initiated from invocation of button 269 are assumed to be tasks that are performed by proxy. Although it is not illustrated in this example, invocation of Transfer Funds button 269 provides an additional interface (not shown) that will contain all of the necessary dialogue fields for facilitating transfer of monies from one account to another. In one embodiment of the present invention invocation of Transfer Funds button 269 provides a list of accounts in the form of URLs. By clicking on these, a user may access those sites and perform manual transfer activities if so desired.

In one embodiment of the present invention, Net Worth module 215 of FIG. 11 is cross-linked with other related modules such that active bill paying, online purchasing, and payment on loans is automatically incorporated into computations for net worth reporting. As was described above, solution-oriented results may be computed from and reported to a variety of the modules described in FIG. 11.

Figure 15:
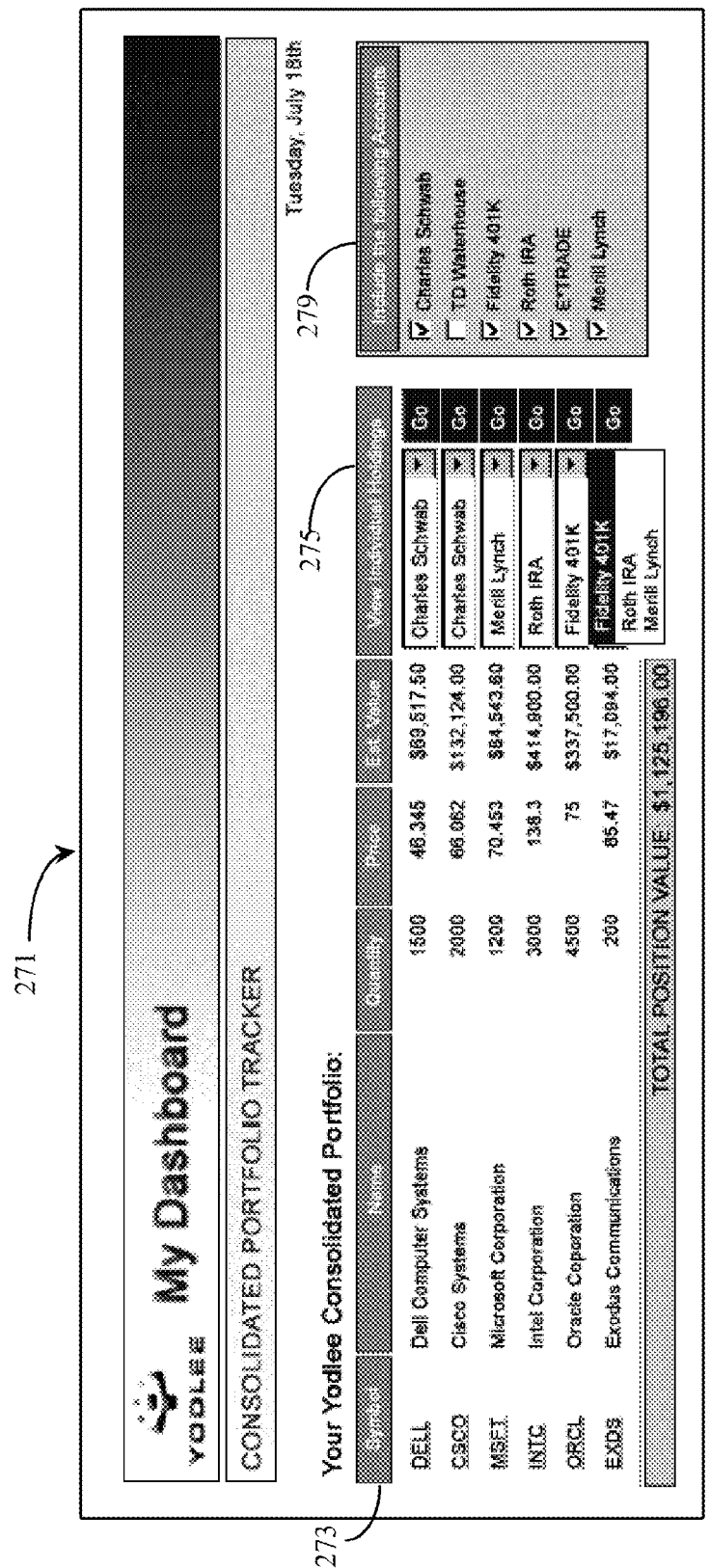
FIG. 15 is an exemplary screen shot of a portfolio tracker interface resulting from invocation of portfolio tracker module 227 of FIG. 11.

FIG. 15 is an exemplary screen shot of a Portfolio Tracker window 271 resulting from invocation of Portfolio Tracker module 227 of FIG. 11. Interface 271 provides a more detailed rendition of the summary information reported on the face of module 227 of FIG. 11. A consolidated portfolio listing 273 is provided within interface 271 and consists of a user's stock symbols, company names, quantities of shares owned, price of individual shares, and estimated value total for each company. In this example, a solution-oriented result reflecting a summation of all of the estimated values of all of the owned stock is provided as a total position value.

An individual-holdings window 275 is provided within interface 271 and adapted to enable a user to view individual stock or investment holdings and also to navigate to actual sites maintaining the accounts as illustrated by the plurality of go buttons representing URLs. An options window 279 is provided within interface 271 and adapted to enable a user to choose only the data that he or she desires to track and view.

It will be apparent to one with skill in the art that interface 211 as illustrated and described in this specification provides all of the mechanisms for ordering, viewing, and manipulating all aspects of online, and some cases off-line user data through a single user interface accessible from an Internet-capable appliance. Data accessible through interface 211 is, in one embodiment, updated each time a user of the interface logs in. In another embodiment, data accessible through interface 211 is updated, in addition, by request termed a refresh action in the art. In still other embodiments, portions of the data accessible through interface 211 are updated by demand while other portions may be updated periodically. Still other portions of data accessible through interface 211 are continually updated in real-time. There are many possibilities.

It will also be apparent to one with skill in the art that interface 211 and functional modules provided therein or accessed thereby may be interfaced to a database reporting engine such as engine 155 of FIG. 8 by, for example, API methods, or to equivalent software functioning as database software resident on a machine having access to users aggregated data.

Interactive Tracking of Financial Portfolio Data

According to an embodiment of the present invention, an Interactive portfolio module is provided as part of an interactive software suite for enabling on-line management of personal data through a single interface. The method and apparatus of the present invention is described in enabling detail below.

Figure 16:
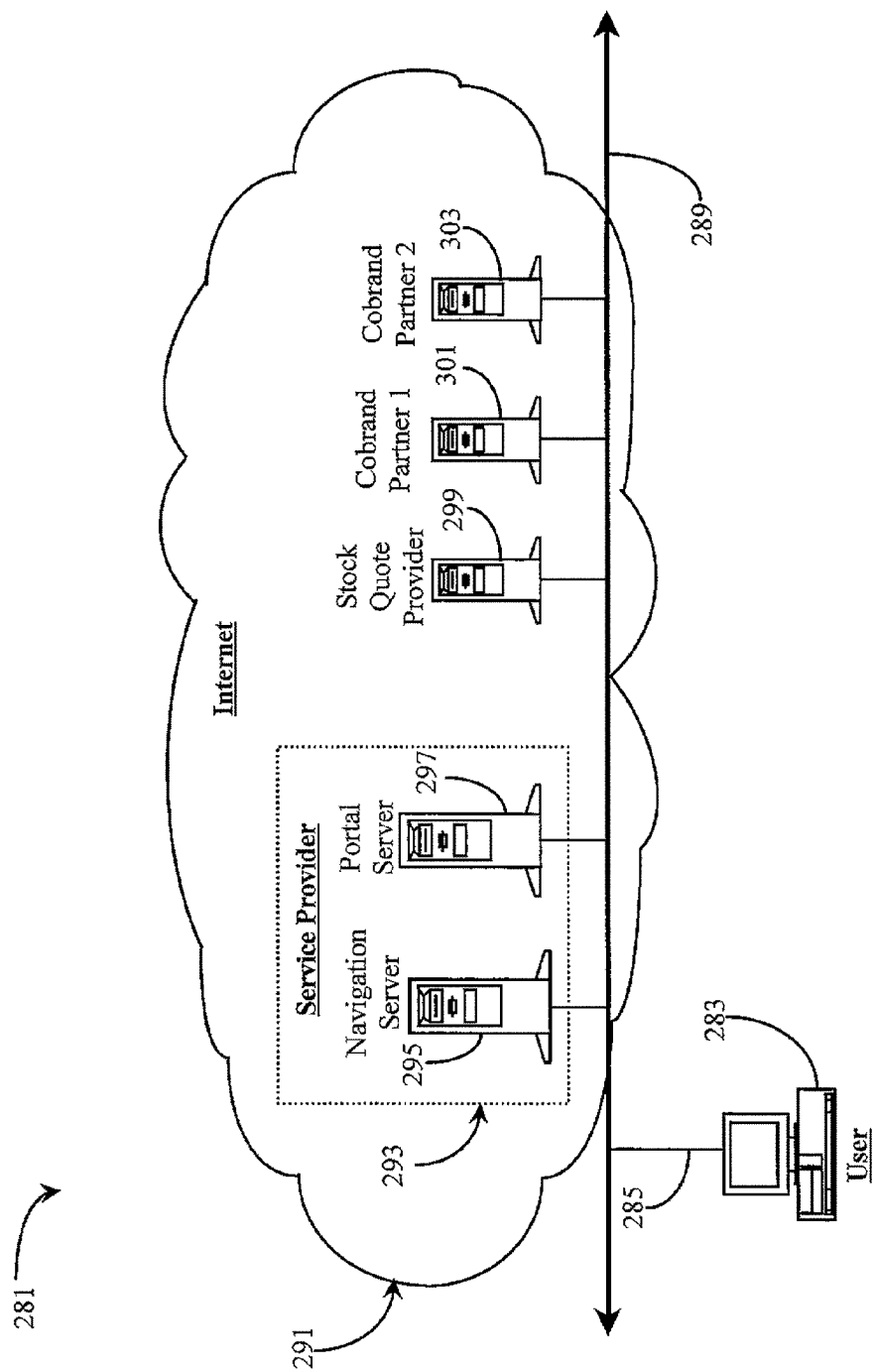
FIG. 16 is an overview of a communications network wherein financial portfolio tracking is practiced according to an embodiment of the present invention

FIG. 16 is an overview of a communications network 281 wherein financial portfolio tracking is practiced according to an embodiment of the present invention. Network 281 comprises a data-packet network 291, which in this example is the well-known Internet network, and an exemplary user 283 illustrated as a PC icon.

DPN 291 is the Internet network in a preferred embodiment and will hereinafter be referred to as the Internet 291. Internet 291 is further exemplified in this example by an Internet backbone 289. Backbone 289 represents all of the lines, equipment and connection points making up the Internet network as a whole. Therefore, there are no geographic limitations to the practice of the present invention.

A service provider 293 is illustrated within Internet 291 and represents an exemplary entity providing data compilation, aggregation and summary services to subscribing users through a single interface as described in the text disclosure above, related to cross-referenced patent applications, which is included in this specification for convenience. Provider 293 comprises a portal server 297 and a navigation server 295. Server 297 is a user interface for accessing services made available by provider 293. As such, server 293 serves electronic information pages termed in the art Web pages to requesting users. Such Web pages (not shown) are personalized interfaces, which are personalized according to the accessing user. Server 297 is connected to backbone 289 and therefore accessible from any node connected to Internet 281 or connected thereto through an interfacing communications network.

Navigation server 295 is adapted as a proxy navigation engine capable of navigating to Web sites, logging into the sites if necessary, and pulling data from such sites on behalf of users requesting those services through interaction with server 297. Server 295 is also illustrated as connected to backbone 289 for the purpose of enabling communication between itself and server 297, and for enabling it to access other file servers connected to backbone 289. In one embodiment, a high-speed data link (not shown) is provided to connect servers 297 and 293 for high-speed server-to-server data communication.

Service provider 293 and the servers 297 and 295 illustrated therein are analogous in many respects to portal station 151, portal interface 153, and gathering sub-system (GSS) server 159 of FIG. 7 above. It may be assumed, although not illustrated in this example, that a data repository for storing user data and aggregated data analogous to data repository 157 of FIG. 7 and a database reporting engine (DBRE) analogous to DBRE 155 of FIG. 7 are also present and adapted accordingly.

A user is connected to the Internet for purposes of this example by a station 283 and an access line 285. Following description may refer, in a shorthand way, to user 283, meaning simply the user at station 283. Access line 285 represents a logical Internet connectivity as may be represented by a wide variety of known connection technologies. In a preferred embodiment, user 283 accesses Internet 291 through an internet-service-provider (ISP) accessible through a telephony network such as a public-switched telephony network (PSTN). This is preferred because of commonality and high rate of public accessibility to the known PSTN. However, user 283 may use other Internet connection methods and equipment in order to access Internet 291. Examples include cable/modem, wireless access through network bridging, satellite Internet services, and so on. In terms of actual connection line, a normal telephone line, digital services line (DSL), integrated services digital network (ISDN) line, or any other type of Internet access line may be used. There are many possibilities.

Internet 291 has a plurality of file servers illustrated therein and shown as having network connection to Internet backbone 289. These are servers 299, 301, and 303. Server 299 represents a file server that provides current quotes on available stocks bought and sold in the stocks and commodities market. Server 299 is capable of providing a variety of public stocks and commodity information such as real time data feeds of current stock pricing by stock symbol, percentage rate information, mutual funds information, and any other relevant financial information that may be broadcast to an interested public. It may be assumed in this example that server 299 serves electronic information pages that are dynamic in nature meaning that the information contained therein changes frequently.

Server 301 represents a partner-hosted server, the term partner defined as an entity providing Internet-accessible services that cooperates with service provider 293 in provision of service to users. Such a relationship is often termed cobranding in the art. Therefore, server 301 is labeled a cobrand partner. A likely cobrand partner hosting server 301 might be Altavista™, or perhaps, America On-line™, which are both organizations which provide a broad variety of services to Internet users, some of which services are purchased from other organizations. Under a cobrand relationship, user 283, assuming he or she is a subscriber to the entity hosting server 301, would access services offered by provider 293 through server 301. Moreover, those services may not provide all of the functionalities that would normally be available if user 283 subscribed directly to service provider 293 for services.

In one embodiment of the present invention server 301 may, instead of being provided on the "open Internet", be provided within the domain of provider 293 and hosted by provider 293. In this case, services available in server 301 (within the domain of provider 293) would be accessible through a primary interfacing server maintained on backbone 289 by a cobrand entity. It can be seen by one with skill in the art that there are many architectural possibilities for a cobrand relationship (providing service function through a third-party entity).

Server 303 represents a file server hosted by an entity making financial service accounts available to individuals who may access them on-line. Such an entity is termed a financial institution (FI) in this specification hence the label FI server 303. User 283 may have a plurality of disparate financial accounts set-up with an entity hosting server 303 wherein data associated with the accounts is available to user 283 through server 303. Such accounts may include investment retirement accounts (IRAs), money market accounts, and other proprietary type investment accounts.

It will be apparent to one with skill in the art that the equipment and network connections illustrated in this example are exemplary only and represents just one architecture supporting the practice of the present invention. It will also be apparent that there may be many more servers provided within Internet 291 and connected to backbone 289 than are illustrated in this example without departing from the spirit and scope of the present invention. Servers 299-303 represent only a sampling and are deemed sufficient for explanation of the present invention. Moreover, such servers may be and often are provided within sub-networks connected to the Internet network and are not necessarily connected directly to an Internet backbone as illustrated herein.

User 283 is illustrated as a PC icon in this example, however it is noted that user 283 may access Internet 291 and practice the present invention through any Internet-capable device having a data display means. It may be assumed in this embodiment that the software suite (software not shown) taught in the cross-referenced specification entitled "Interactive Activity Interface for Managing Personal Data and Performing Transactions Over a Data Packet Network" is provided (served) to user 283 from portal server 297 upon request from and authentication of user 283 during a network session. Therefore, it may be assumed that user 283 has the described suite displayed in the form of an interactive HTML interface on, in this case, the PC monitor of user 283.

In practice of the present invention according to one embodiment, user 283 logs into Internet 291 and accesses portal server 297 via access line 285 and backbone 289. Once authenticated, user 283 is served an interactive software interface suite of which the portfolio-tracking module is a part, as described above. This interactive interface is served, in this example, as an HTML interface. By invoking and working within the portfolio-tracking module, user 283 may view and track any one, combination of, or all of his or her financial accounts available in server 303 and in other like servers. Through the same module, user 283 may obtain any desired combination of financial quotes available through server 299 and through other like servers.

In another embodiment of the present invention, user 283 accesses server 301 instead of server 297 and is served an interface attributable to the entity hosting server 301. However, added function of portfolio tracking is provided through server 301 in cooperation with service provider 293, which provides the back-end functionality for fulfilling the data requirements of user 283 in this cobrand scenario. Through server 301, user 283 may track financial accounts accessible through server 303 and may obtain any combination of quotes available through server 299. In the case of a cobrand situation, server 301 communicates and cooperates with at least server 295 if not both servers 297 and 295 of service provider 293 in order to realize the back-end functions of automated proxy-navigation, data procurement, aggregation, and presentation, which may include intelligently calculated results. More detail regarding the portfolio-tracking method and supporting software is described below.

Figure 17:
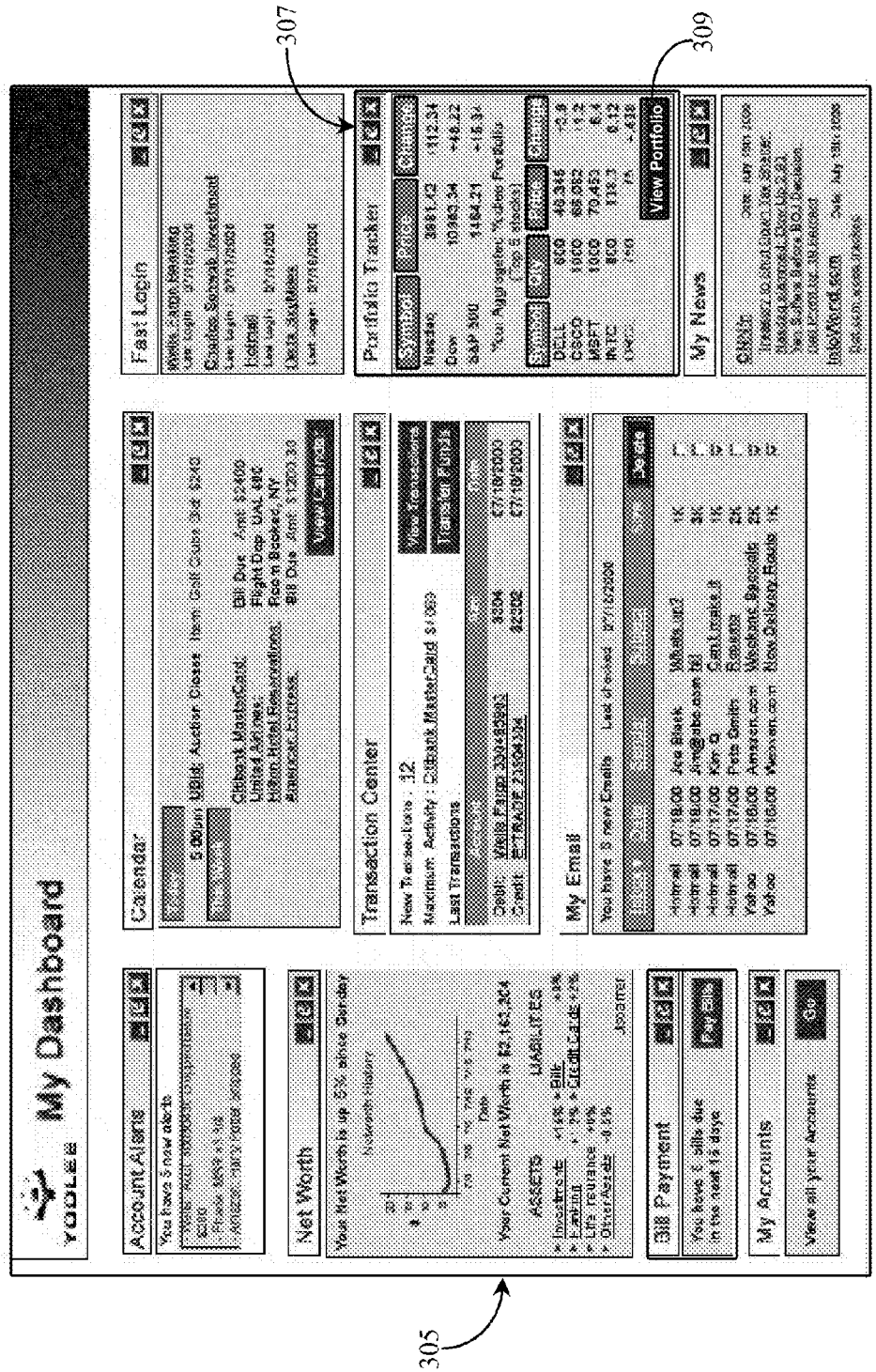
FIG. 17 is an exemplary screen shot of an interactive interface suite

FIG. 17 is an exemplary screen shot of an interactive interface suite 305, which is analogous to interface 243 of FIG. 11. Interface 305 is adapted in the same fashion and function described in FIG. 11 above. This specification focuses on a portfolio-tracking module 307 provided in the far right column of interface 305. Module 307 is analogous to module 227 of FIG. 11.

Interface 305 including module 307 is assumed in this example to be displayed on the PC screen of user 283 of FIG. 16 in a direct-access embodiment wherein portal 297 of the same is the interface serving server. Module 307 has a text summary face for summarizing portfolio data designated to be tracked by a requesting user. The summary face of module 307 automatically updates each time a user logs in to the hosting server. Data summarized on the face of module 307 includes, in this example, three financial vehicles listed under a symbol column, the total cash values of user funds invested in those vehicles listed under an adjacent column labeled price, and indications of percentage changes for all of the user funds associated with the financial vehicles listed under a column labeled change.

In addition to a summary including total values held in each listed financial vehicle, real estate is provided on the face of module 307 for summarizing, in this example, top 5 performing stocks. The 5 stocks are listed in line-item fashion with data attributes identified in columns labeled symbol, qty (quantity), price, and change. Listed under the column labeled symbol are the symbols of each stock. Listed under the column labeled qty are the quantities of shares held for each stock. Listed under the column labeled price are the last available prices per share of each listed stock. Listed under the column labeled change are the percent changes attributed to each stock as most recently known.

In a preferred embodiment, the summary face of module 307 is configurable in terms of the data that will be presented. The selected data for presentation is updated once when a requesting user logs in and is thereafter authenticated and periodically updated frequently while the authenticated user is in session. A typical update frequency is approximately every 15 minutes. However, any practical period may be observed. It will be apparent to one with skill in the art that module 307 may command more or less real estate of interface suite 305 depending on the amount of data ordered for display on the summary face of the module.

An interactive link 309 (View Portfolio) is provided on the summary face of module 307 and adapted to launch, upon interaction therewith a secondary interface having a more detailed display of financial portfolio data.

Figure 18:
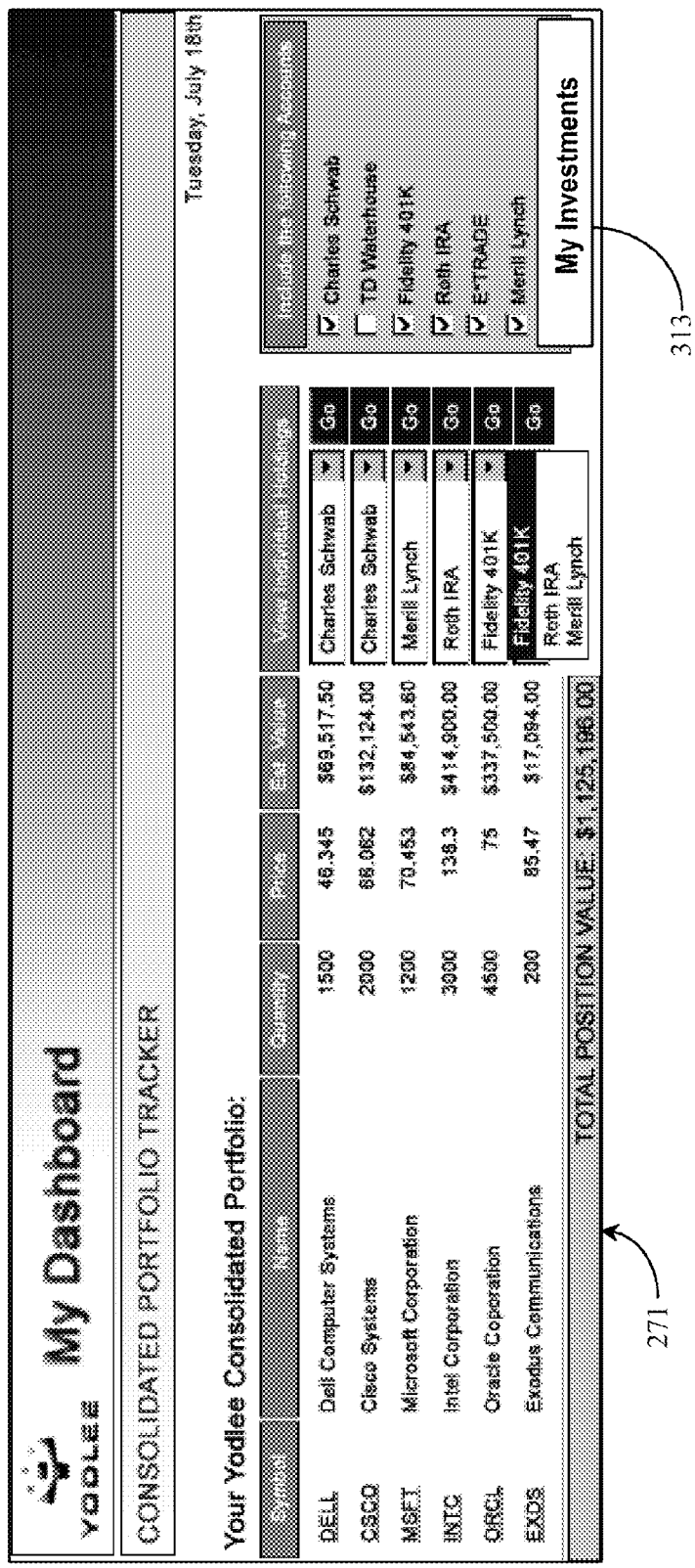
FIG. 18 is a secondary interface invoked as a result of user interaction with icon 309 within module 307 of FIG. 17

FIG. 18 is a secondary interface 271 invoked as a result of user interaction with icon 309 within module 307 of FIG. 17. Interface 271 is identical to the interface (271) of FIG. 15 above and retains the same element number. Interface 271 provides a more detailed rendition of the summary information reported on the face of module 307 of FIG. 17. Interface 271 contains a variety of interactive mechanisms for viewing data.

A consolidated portfolio listing comprises one such interactive mechanism for viewing data. A column listing a user's stock symbols is illustrated at far left within interface 271 and labeled Symbol. An adjacent column labeled Name is provided for listing the company names associated with each listed stock symbol. Reading from left to right, a next column labeled Quantity is provided for listing quantities of shares owned of each represented stock. A next column is provided for listing price per share of each represented stock and is labeled Price. A next column labeled Est. Value is provided for listing estimated total cash-values of owned stock of each represented stock. In this example, a solution-oriented result reflecting a summation of all of the estimated values of all of the owned stock is provided as a total position value located immediately underneath the described portfolio listing.

An interactive viewing section is provided within interface 271 and adapted to enable a user to view individual investment holdings maintained by third-party entities. This section is illustrated under a column labeled View Individual Holdings and comprises a plurality of interactive drop-down menus containing interactive options describing individual investment accounts. Such accounts are not stock holdings, but rather holdings maintained by third-party entities such as IRAs, 401K plans and so on. It is important to note herein that the interactive options are hyperlinks whereupon selection of and invocation an adjacent "go" icon associated with each menu launches a new browser window that enables navigation to the particular server-site hosting account data covered under the selected option.

According to another embodiment of the invention, selection of an interactive option presented within a described drop-down menu may invoke a secondary interface containing "aggregated data" obtained through proxy navigation, log-in, and parsing of the Web-site associated with a selection. In this case, no physical navigation or log-in procedures are required of a requesting user. It is noted herein that in either case, full account manipulation is possible whether through direct user navigation to a site, or by proxy task performance performed on behalf of a requesting user.

An account configuration interface is provided within interface 271 and adapted to enable a user to pre-configure individual accounts for display in the view-holdings section of interface 271. In this example, accounts listed on the face of the configuration interface are associated with adjacent selection boxes, which may be checked or not in order to include or exclude tracking of those accounts.

An interactive icon 313 labeled My Investments is provided, in this example, within the just-described configuration interface. Icon 313 may be provided in a convenient location within interface 271. Icon 313 is adapted to launch, upon invocation thereof, a secondary interface for viewing detailed stock holdings by symbol as detailed below.

It will be apparent to one with skill in the art that the look and feel of the interactive mechanisms described in the example may vary in terms of how they are presented and in what order without departing from the spirit and scope of the present invention. It will also be apparent that each interactive function initiated through user input of some fashion is supported by back-end software taught in the various cross-referenced applications included in this specification.

FIG. 19 is an exemplary screen shot of a secondary interface 315 invoked as a result of interaction with icon 313 of FIG. 18. Interface 315, labeled My Investments, is an interactive interface listing stock accounts tracked on behalf of an invoking user. Each represented stock is listed in line-item form with various data attributes separated in column fashion. Reading from left to right, a first column labeled Symbol lists each included stock by its public stock symbol. A next column labeled Quantity adjacent to the Symbol column is provided within interface 315 and lists quantities of shares held for each included stock. A next column labeled Price is provided within interface 315 and lists price per share of represented stocks. A next column labeled as of is provided within interface 315 and lists the time and/or date of the last price change occurring in the price column. A next column labeled $ Change is provided within interface 315 and lists percentage fluctuations of the last updated price changes listed in the price column. A next column labeled Calculated Value is provided within interface 315 and lists total cash values of user-held shares of represented stocks according to a last update.

Interface 315 is a dynamic interface, meaning that it is periodically updated during user sessions and in a preferred embodiment, at time of user log-in. Constantly updated Information displayed within interface 315 is procured from a third-party site providing real-time stock ticker information. In this embodiment, the provider is the well-known S&P Comstock exchange. In other embodiments, other third-party providers may be used.

An interactive icon 317 labeled Get Quote is provided within interface 315 and adapted to enable a user, upon invocation thereof, to obtain a near real-time quote of any listed stock that is selected for the purpose. A user selecting a stock symbol listed in the symbol column and then invoking icon 317 places an order for a real-time quote of current stock price for purchase. In one embodiment, a proprietary quoting engine (not shown) is utilized for this purpose. In other embodiments, quote requests are delivered to third-party providers associated with the selected stock. There are many possibilities.

Figure 20:
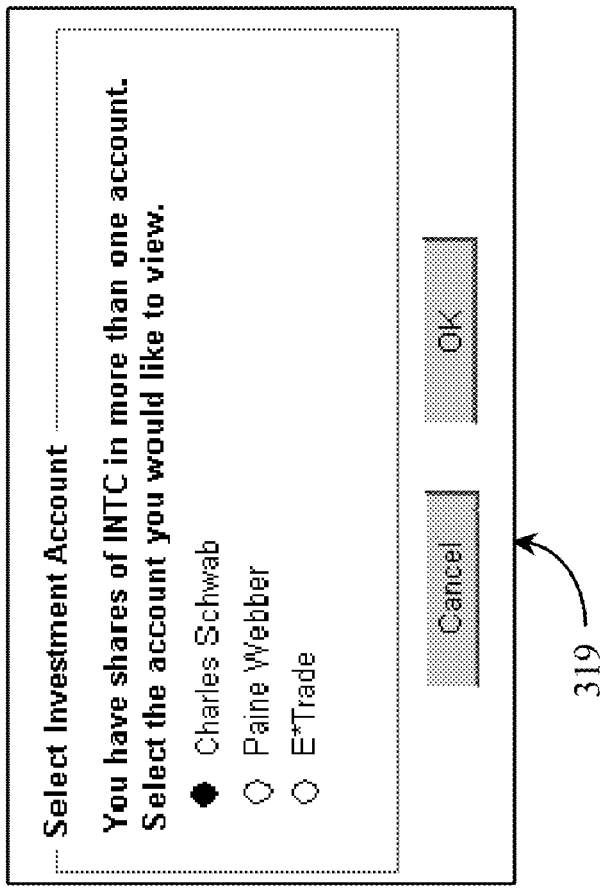
FIG. 20 is an exemplary screen shot invoked as a result of user interaction with one of the plurality of represented stocks displayed in interface 315 of FIG.

FIG. 20 is an exemplary screen shot 319 invoked as a result of user interaction with one of the plurality of represented stocks displayed in interface 315 of FIG. 19 according to an embodiment of the present invention. Interface 319 is an interactive view-account interface invoked by a user selecting a particular stock for viewing. In this example, interface 319 indicates that the particular stock selected is shared as an included stock invested in by 3 different user-held investment accounts. The described investment accounts are listed within interface 319 and associated with adjacent selection boxes. A user may indicate which account to view the represented stock from by selecting an appropriate selection box. A cancel icon and a submission icon are also provided within interface 319 and adapted for respective functions as labeled.

FIG. 21 is an exemplary screen shot of a configuration interface 321 for adding and selecting investment accounts and stocks for tracking and reporting according to an embodiment of the present invention. Interface 321 is an interactive interface that may be accessed through provision of an interactive link in any of the above-described interfaces including within the summary face of module 307 of FIG. 17. A section for selecting investment accounts for tracking is provided within interface 321 and adapted to list all pre-configured investment accounts wherein a selection box is provided adjacent to each listed account. In this example, there are three listed accounts having all associated selection boxes selected for tracking. In the event that a user account is not yet pre-configured to interface 321, the user may opt to add an account for tracking An interactive icon labeled Add a New Account is provided for this purpose. By invoking the add a new account icon, a secondary interface (not shown) appears wherein a user may add all of the required parameters of the new account for tracking By action of submitting the new account information, the target account appears in the list of already configured accounts within interface 321.

A separate interactive section is provided within interface 321 and adapted to enable a user to select one or more providers from which updated stock information is acquired and tracked. The providers represented in this list routinely provide current information regarding stocks under their respective coverages such as through continual stock feeds. In this example, there are three listed providers having adjacent selection boxes checked indicating that periodically updated information will be acquired on behalf of the invoking user and rendered available through one or more of the interfaces described in this specification.

A separate dialog window for adding stocks and/or funds to track is provided for entering additional symbols of stocks or funds covered by one or more of the listed providers for portfolio addition. Entering additional symbols in this dialog window results in the additional information being acquired from one or more of the provider services and rendered as data viewable in one or more of the interfaces described in this specification. A function may also be provided for de-selecting symbols that are currently being tracked. In one embodiment, a user may request that information be acquired from a provider that is not included in the list of providers illustrated in interface 321. In a case where a requested provider has no relationship with the service provider hosting the tracking capability, then the service provider may, if enough requests have been received, act to bring the new provider on-board as a cooperating data source. It is noted herein that many types of public data sources may be exploited including but not limited to data feeds, dynamic third-party interfaces, news feeds, and so on. There are many possibilities.

Portfolio Synchronizing

In another aspect of the present invention a method is provided that enables automated on-line management of personal financial data through virtually any connected interface. This capability is termed portfolio synchronizing by the inventors, because it provides for automated accessing, updating, and management of a plurality of financial sources through any single and connected interface. This feature, working with the previously described portfolio tracker module 227 described with reference to FIG. 11, can provide varying capability in alternate user-interfaces through which account services are accessed. A user may in fact subscribe to portfolio information through a multiplicity of secondary (cobranded) interfaces and use portfolio synchronizing through a main service-provider to maintain and update all account interfaces from any connected single interface without the need to manually access any specific interface or Web-site. Such a method is described in enabling detail below.

Figure 22:
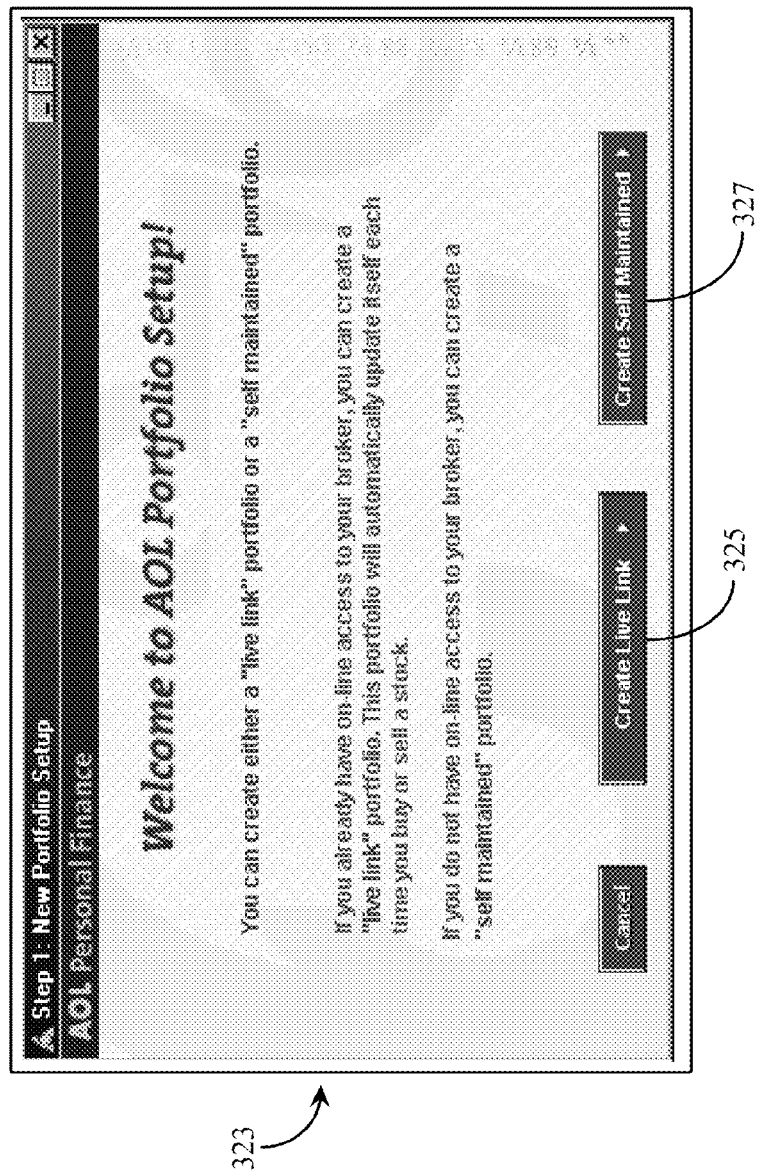
FIG. 22 is an exemplary screen shot of a cobranded portfolio setup page according to an embodiment of the present invention.

FIG. 22 is an exemplary screen shot of a cobranded portfolio setup page 323 according to an embodiment of the present invention. Cobranded portfolio setup page 323 in this embodiment displays the Web-page presence of a well known Internet Service Provider (ISP) and Web Portal. Set-up page 323, hereinafter referred to as interface 323, represents an initial (electronic) page for enabling setup of a personal page for portfolio synchronizing from within a personal finance module of the well-known America On-Line™ (AOL) ISP and Portal service. Interface 323, as with other interfaces that will be described in this specification, is adapted as an HTML interface served by a network-connected file server accessible through interaction on the network with a network-capable appliance as is described in numerous references and embodiments described above. Interface 323 provides an exemplary sample of only one of a multiplicity of ISPs and Portal Service Providers (PSPs) that provide similar financial services and interfaces for registered users. Examples of other well-known providers include Altavista™ and Yahoo™. Portfolio Synchronizing capability may be established at any one or more of the referenced ISP and Portal providers as deemed desirable by a user. This exemplary use of this ISP in no way limits or constrains the utilization of the feature presented in this embodiment of the invention.

As indicated at the top of interface 323, the display represents a first step for setting up a new financial portfolio for a specific accessing user. The first line of text in the body of interface 323 indicates to an accessing user that he or she may establish a "live link" portfolio or a "self maintained" portfolio. The choice is briefly referenced in the two paragraphs that follow the single line of text. In the first paragraph, if a "live link" is desired, an on-line access must be in place or established with an included brokerage service or financial institution (FI). In this configuration a user's portfolio may be updated automatically or by the click of a button each time a trade is made of an equity, fund, annuity, etc. In a preferred embodiment of the present invention updating is accomplished by establishing embedded "data" links within the affected interfaces such that knowledge of data transactions initiated through any one of the interfaces as propagated to an incorporated within the other interfaces.

In the second paragraph, if a user chooses to establish a "self maintained" portfolio the user is not required to have on-line access to a brokerage system or FI and updates must be manually made by the user. At the bottom of the page are three hyperlink buttons that from left to right accomplish the cancellation of the page, navigation to a sub-interface for creating a live link portfolio or, to a sub-interface for creating a self-maintained portfolio.

In one embodiment, complete synchronizing through detection of user activity for a user maintaining more than one interface is entirely transparent to the user if the FI accessed to initiate a transaction is linked to at least one of the interfaces. In another embodiment wherein the FI is not on-line, a user may update any one of more than one interface to reflect a transaction and the other interfaces will automatically update to reflect the new data.

Figure 23:
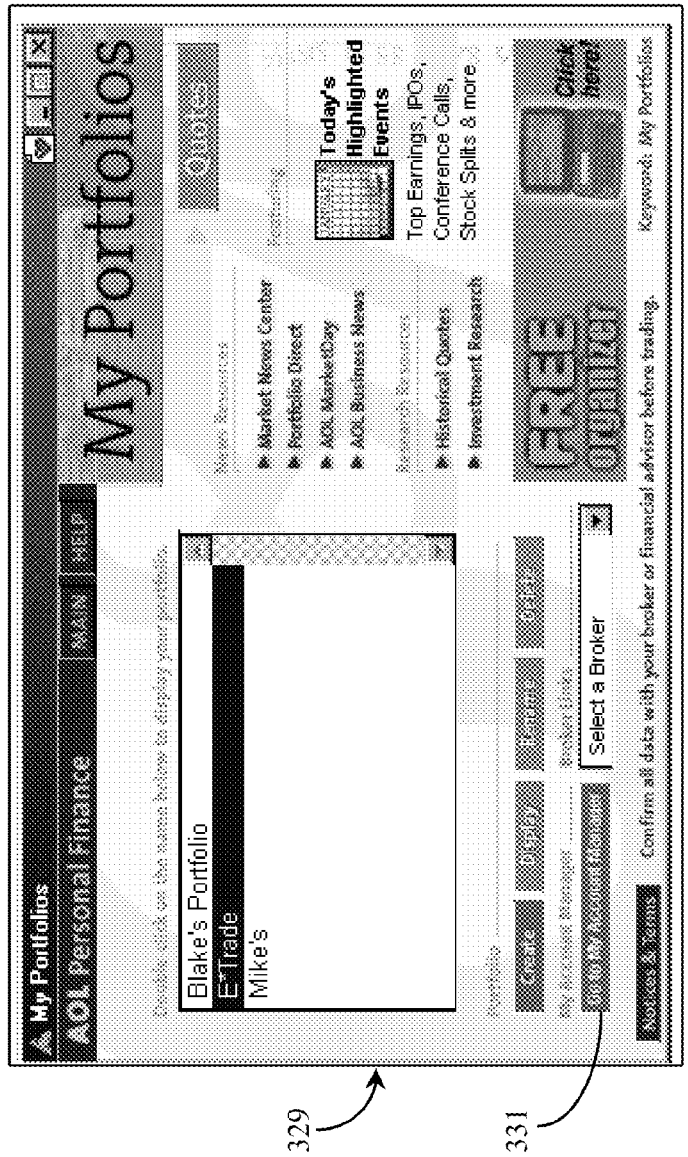
FIG. 23 is an exemplary screen shot of a cobranded portfolio main page according to an embodiment of the present invention.

FIG. 23 is an exemplary screen shot of a cobranded portfolio main page 329 according to an embodiment of the present invention. Main page 329, hereinafter referred to as interface 329, again displays the Web-page presence of the well known ISP and PSP AOL™. Interface 329 shows the main page for establishing personalized portfolios that will be maintained across multiple interfaces through portfolio synchronizing provided by the present invention. The established portfolios that are to be updated by the portfolio synchronizing are displayed in a provided scroll-window illustrated at upper left within interface 329. In this exemplary display are three listed portfolios: Blake's Portfolio, E*Trade (a major on-line brokerage firm), and Mike's portfolio. By clicking and thereby highlighting one of the portfolios listed within the scroll-widow a user may click on a provided display button located in a convenient location beneath the scroll-window to open the selected portfolio. Other controls provided for manipulating the listed accounts within a portfolio, or a portfolio itself are indicated beneath the described scroll-window within display 329 and are labeled as a Create icon, a Rename icon, and a Delete icon.

A user can create new accounts within a portfolio, as well as Display, Rename, or Delete selected accounts within a portfolio. It must be emphasized herein that the exemplary display mechanisms illustrated as functions available within interface 329 are within the current art of existing servers and linking services. The unique aspect of this description is not the appearance or functionality of the display itself, but the automated updating capability across multiple interfaces made possible by the portfolio synchronizing feature functioning in conjunction with the portfolio tracker 227 of FIG. 11, through all cobranded interfaces for all FI or investment accounts established by a user.

It is assumed in this example that a user has a main account set-up with a main service provider as defined within cross-referenced applications noted in this specification. Therefore, when a user adds a new FI account through the "main" service previously described, the account is immediately available in all set-up cobranded portfolios. In this case, the main service sets-up the account at the supported FI site and propagates the parameters of the new account to all of the user's registered cobrand interfaces. By the same token, a user may add an account through any one of the cobrand interfaces, or through the FI itself. In the latter cases, synchronizing is automatic provided all of the entities are on-line.

Each account is maintained as a separate account in all cobranded portfolios and when a user refreshes any account, that account is immediately refreshed on all cobranded portfolios. Hyperlinks (not illustrated here) provide automated linking capability from the portfolio tracker module 227 of FIG. 11 to interface 329 and from interface 329 to the transaction-center module 221 of FIG. 11 and so on. It is the prolific hyperlinking that enables the service of the present invention. For example, a hyperlink 331 is provided within interface 329 and adapted to take a user to a service provider charged managing a selected account. A drop-down menu is also provided for the purpose of linking registered brokers to the service of the present invention.

Figure 24:
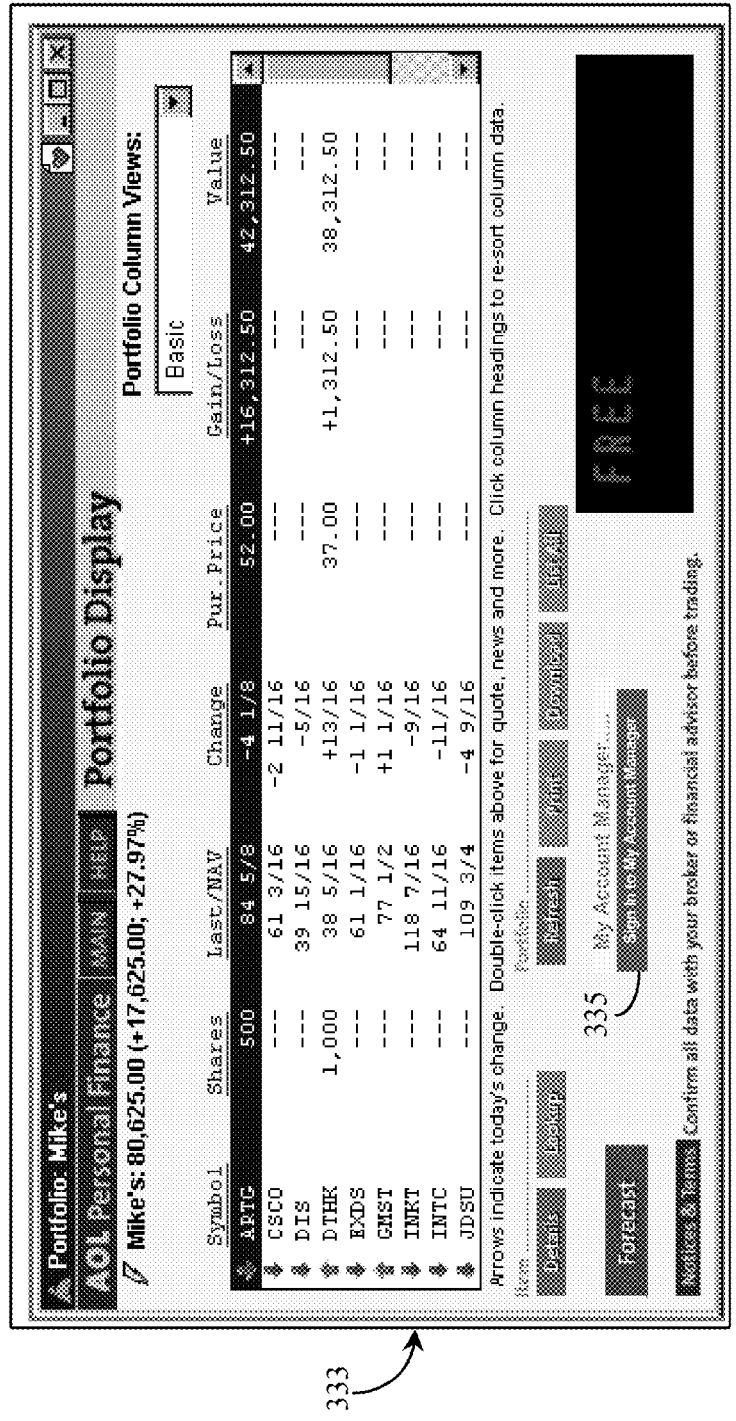
FIG. 24 is an exemplary screen shot of a cobranded portfolio display page according to an embodiment of the present invention.

FIG. 24 is an exemplary screen shot of a cobranded portfolio display page 333 according to an embodiment of the present invention. Page 333, hereinafter termed interface 333, is displayed as it might appear on the Web page presence of a well known ISP and/or PSP, which in this example, is the well-known AOL™. A listing of financial symbols (stocks) appears within an account-display window located substantially in the center of interface 333. The listed data is typical of such lists available from a multiplicity of on-line financial services providing stock information. The listing includes from left to right, columns for the symbol of the equity or fund, shares owned or tracked, last ticker share price or Net Asset Value (NAV), points change, purchased price, accumulative gain or loss in value of the commodity, and current value of each commodity.

At the upper left of the display page just below the logo of the well-known ISP/PSP of this example is the name of the specific portfolio of which the data is displayed within the described account-display window. A total value of Mike's portfolio is presented along with the cumulative gain or loss presented in both dollar value and percentage within the associated parenthesis. In this example, Mike's portfolio represents tracked stocks. However, other FI activities may be represented without departing from the spirit and scope of the present invention.

A drop-down menu labeled Portfolio Column Views is provided at upper right of interface 333 and is adapted to enable a user to select a viewing arrangement for presented data. It is noted herein that the functionality inherent to interface 333 is actually provided by a main service provider as described above. And again, it must be noted, that the unique capability provided by the portfolio synchronizing feature of this invention is not in the displays themselves, but in the capability of providing seamless updates and changes at a single display of activity associated with any of numerous accounts listed in a portfolio, wherein the accounts are established at many disparate brokerage or on-line equity trading services without having to manually access each of those services, or any particular interface displaying portfolio information.

In addition, the portfolio synchronizing aspect of the present invention provides a user with a capability of having any action performed at a Web site of any one of a variety of financial or brokerage services that are registered with the service to be implemented into all included cobranded interfaces and into the main interface (main service provider) transparently to the user.

It will be apparent to one with skill in the art that the present invention may be implemented as exemplified in FIGS. 22, 23, and 24 utilizing a variety of personal financial services and communication paths without departing from the spirit and scope of the present invention. For example in a simple embodiment the portfolio synchronizing capability can be used to provide a user with updating, status, and control of a financial portfolio through a single interface of the user's favorite ISP and or PSP without having to physically access the financial service (main) Web site.

In a much more dynamic embodiment the portfolio synchronizing capability can provide complete updating, status, and control of a multiplicity of financial portfolios through any one of multiple financial or brokerage Web sites or a single interface implemented in any one of various ISP and/or PSP services so a user does not have to physically navigate to any of the individual Web sites specific to any one action as is typical of current art capabilities. The latter embodiment requires that the FI Web-site also be implemented as a cobranded Web-site for viewing and accessing account information.

In all aspects of the present invention, registered interfaces that are cobranded to the functionality of a main service provider providing a main interface are supported by back-end software maintained and implemented by the main service provider. The described software and equipment that the software is implemented on is described in detail in FIGS. 1 through 9 and in FIG. 16 included in this specification.

By practicing the method of the present invention, a user may, after setting up the accounts, initiate a transaction from a financial Website such as purchasing an amount of stock. Immediately after the purchase, the parameters associated with the purchase are immediately propagated to all registered interfaces from within which the information is rendered accessible. Likewise, proxy transaction parameters wherein the transactions are performed on behalf of a user through third party sites may be propagated in the same way and rendered accessible from within all registered interfaces.

The method and apparatus of the present invention may be practiced via private individuals on the Internet, businesses operating on a WAN connected to the Internet, businesses operating via private WAN, and so on. There are many customizable situations. The present invention as taught herein and above should be afforded the broadest of scope. The spirit and scope of the present invention is limited only by the claims that follow.

What is claimed is:

1. An account coordination system, comprising:

an Internet-connected server executing software from a non-transitory, machine-readable medium, the software providing:

direct linking between the server and two or more financial enterprises hosting each at least one financial account for a specific user and having an interactive interface through which the user may interact with his/her account;

direct linking between the server and one or more third-party enterprises providing interactive interfaces through which the user may access and interact with one or more of the financial accounts at the financial enterprises; and tracking functionality whereby the server tracks activity by the user at any of the interactive interfaces through which the user may interact with one of the financial accounts;

wherein the server propagates any change made in an account by the user at any one of the interactive interfaces to the sites hosting the other interactive interfaces.

2. The system of claim 1 wherein activity by the user comprises opening or closing an account.

3. The system of claim 1 wherein activity by the user comprises depositing or withdrawing funds to or from an account.

4. The system of claim 1 wherein activity by the user comprises paying a bill.

5. The system of claim 1 wherein activity by the user comprises arranging payment terms for an obligation.

6. A method for account coordination, comprising the steps of:
(a) direct linking between a server and two or more financial enterprises hosting each at least one financial account for a specific user and having an interactive interface through which the user may interact with his/her account;
(b) direct linking between the server and one or more third-party enterprises providing interactive interfaces through which the user may access and interact with one or more of the financial accounts at the financial enterprises;
(c) tracking activity by the user at any of the interactive interfaces through which the user may interact with one of the financial accounts; and
(d) propagating any change made in an account by the user at any one of the interactive interfaces to the sites hosting the other interactive interfaces.

7. The method of claim 6 wherein activity by the user comprises opening or closing an account.

8. The method of claim 6 wherein activity by the user comprises depositing or withdrawing funds to or from an account.

9. The method of claim 6 wherein activity by the user comprises paying a bill.

10. The method of claim 6 wherein activity by the user comprises arranging payment terms for an obligation.

* * * * *